United States Patent [19]
Hanyu et al.

[11] Patent Number: 5,543,943
[45] Date of Patent: Aug. 6, 1996

[54] CHIRAL SMECTIC DEVICE SUBJECTED TO A SIMULTANEOUS THERMAL AND AC FIELD TREATMENT

[75] Inventors: Yukio Hanyu; Akira Tsuboyama, both of Atsugi; Osamu Taniguchi, Chigasaki; Tadashi Mihara, Isehara; Katsutoshi Nakamura, Atsugi; Sunao Mori, Atsugi, all of Japan

[73] Assignee: Canon Kabushiki Kaisha, Tokyo, Japan

[21] Appl. No.: 554,031

[22] Filed: Nov. 6, 1995

Related U.S. Application Data

[63] Continuation of Ser. No. 7,794, Jan. 22, 1993, abandoned.

[30] Foreign Application Priority Data

Jan. 24, 1992 [JP] Japan ................................ 4-032816
Jan. 30, 1992 [JP] Japan ................................ 4-040211

[51] Int. Cl.$^6$ ..................... G02F 1/13; G02F 1/1343; G02F 1/1337
[52] U.S. Cl. .................. 359/43; 359/56; 359/76; 359/78; 359/100
[58] Field of Search .................. 359/43, 56, 76, 359/78, 100

[56] References Cited

U.S. PATENT DOCUMENTS

| | | | |
|---|---|---|---|
| 4,367,924 | 1/1983 | Clark et al. | 350/334 |
| 4,728,176 | 3/1988 | Tsuboyama et al. | 350/350 S |
| 4,744,639 | 5/1988 | Tsuboyama | 350/350 S |
| 4,778,259 | 10/1988 | Kitayama et al. | 350/350 S |
| 4,783,148 | 11/1988 | Tsuboyama et al. | 350/341 |
| 4,796,979 | 1/1989 | Tsuboyama et al. | 350/350 S |
| 4,820,026 | 4/1989 | Okada et al. | 350/341 |
| 4,878,740 | 11/1989 | Inaba et al. | 350/337 |
| 4,898,456 | 2/1990 | Okada et al. | 350/350 S |
| 4,932,758 | 6/1990 | Hanyu et al. | 350/350 S |

(List continued on next page.)

FOREIGN PATENT DOCUMENTS 444705 9/1991 European Pat. Off. .
494626 7/1992 European Pat. Off. .

OTHER PUBLICATIONS

Oh–E et al., Liquid Crystals, vol. 11, No. 1 (1992) pp. 101–109.
Kuwahara et al., Proceedings of the SID, vol. 32, No. 4 (1991) pp. 387–91.
Koden, et al., Jap. Journal Applied Physics, vol. 30, No. 10 (1991) pp. 1823–5.
Orihara, et al., Jap. Journal Applied Physics, vol. 28, No. 4 (1989) pp. 676–8.
Jakli, et al., Ferroelectrics, vol. 69, No. 314 (1986) pp. 153–63.
Nagano et al., Jpn. J. Appl. Phys., vol. 19, No. 10, Oct. 1980, 2013–2014.
Ouchi et al., Jpn. J. Appl. Phys., vol. 27, No. 5, May 1988, L725–L728.

*Primary Examiner*—William L. Sikes
*Assistant Examiner*—Ron Trice
*Attorney, Agent, or Firm*—Fitzpatrick, Cella, Harper & Scinto

[57] ABSTRACT

A ferroelectric liquid crystal device is constituted by disposing a ferroelectric liquid crystal between a pair of substrates having thereon electrodes for voltage application and provided with uniaxial alignment axes, as by rubbing, so as to provide a high pretilt angle of at least 10 degrees. A problematic liquid crystal movement in such a high-pretilt angle ferroelectric liquid crystal device is suppressed by improving a smectic layer structure therein, inclusive of a symmetry of pretilt angles at the pair of substrate boundary surfaces. Such an improved smectic layer structure is accomplished by a realigning treatment after cooling to the chiral smectic phase or in the final stage of the cooling to the chiral smectic phase as by application of an AC electric field and/or by repetitive heating-cooling in the chiral smectic phase. The improved smectic layer structure is represented by, e.g., an X-ray diffraction peak having an increased peak area and/or a decreased half-value width.

10 Claims, 15 Drawing Sheets

U.S. PATENT DOCUMENTS

| | | | |
|---|---|---|---|
| 4,941,736 | 7/1990 | Taniguchi et al. | 350/350 S |
| 4,958,915 | 9/1990 | Okada et al. | 350/345 |
| 4,997,264 | 3/1991 | Coulson | 359/100 |
| 5,013,137 | 5/1991 | Tsuboyama et al. | 350/333 |
| 5,026,144 | 6/1991 | Taniguchi et al. | 350/350 S |
| 5,109,294 | 4/1992 | Hanyu et al. | 359/83 |
| 5,124,820 | 6/1992 | Tsuboyama et al. | 359/56 |
| 5,129,727 | 7/1992 | Hanyu et al. | 359/75 |
| 5,138,473 | 8/1992 | Dijon et al. | 359/100 |
| 5,151,804 | 9/1992 | Verhulst et al. | 359/100 |
| 5,164,852 | 11/1992 | Konuma | 359/100 |
| 5,182,549 | 1/1993 | Taniguchi et al. | 340/784 |
| 5,189,536 | 2/1993 | Hanyu et al. | 359/56 |
| 5,204,766 | 4/1993 | Taniguchi et al. | 359/100 |
| 5,227,904 | 7/1993 | Nakanowatavi et al. | 359/76 |

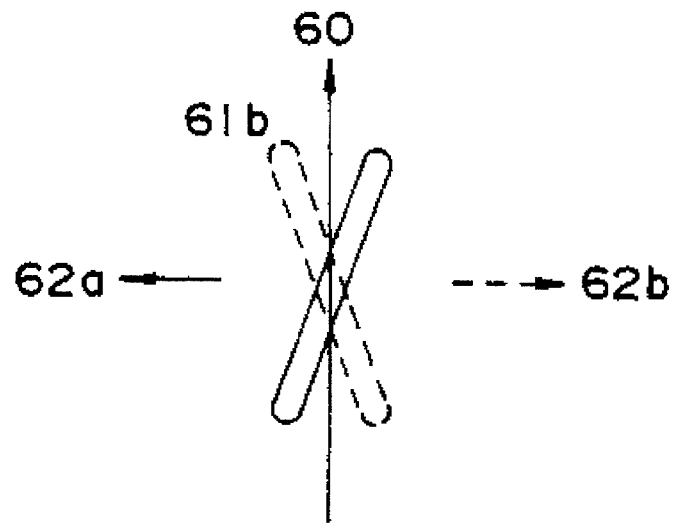
FIG. IA
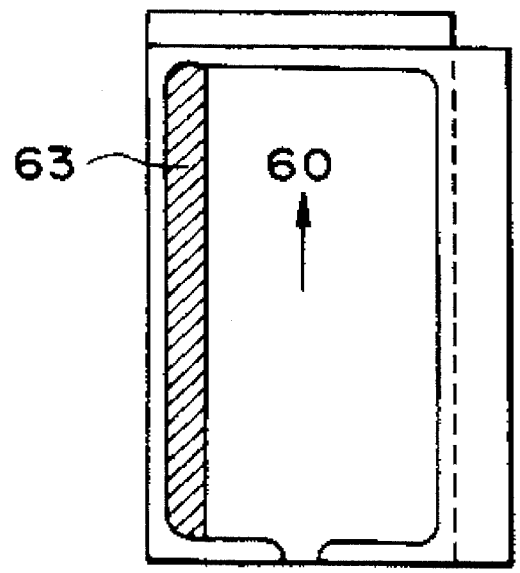
FIG. IB

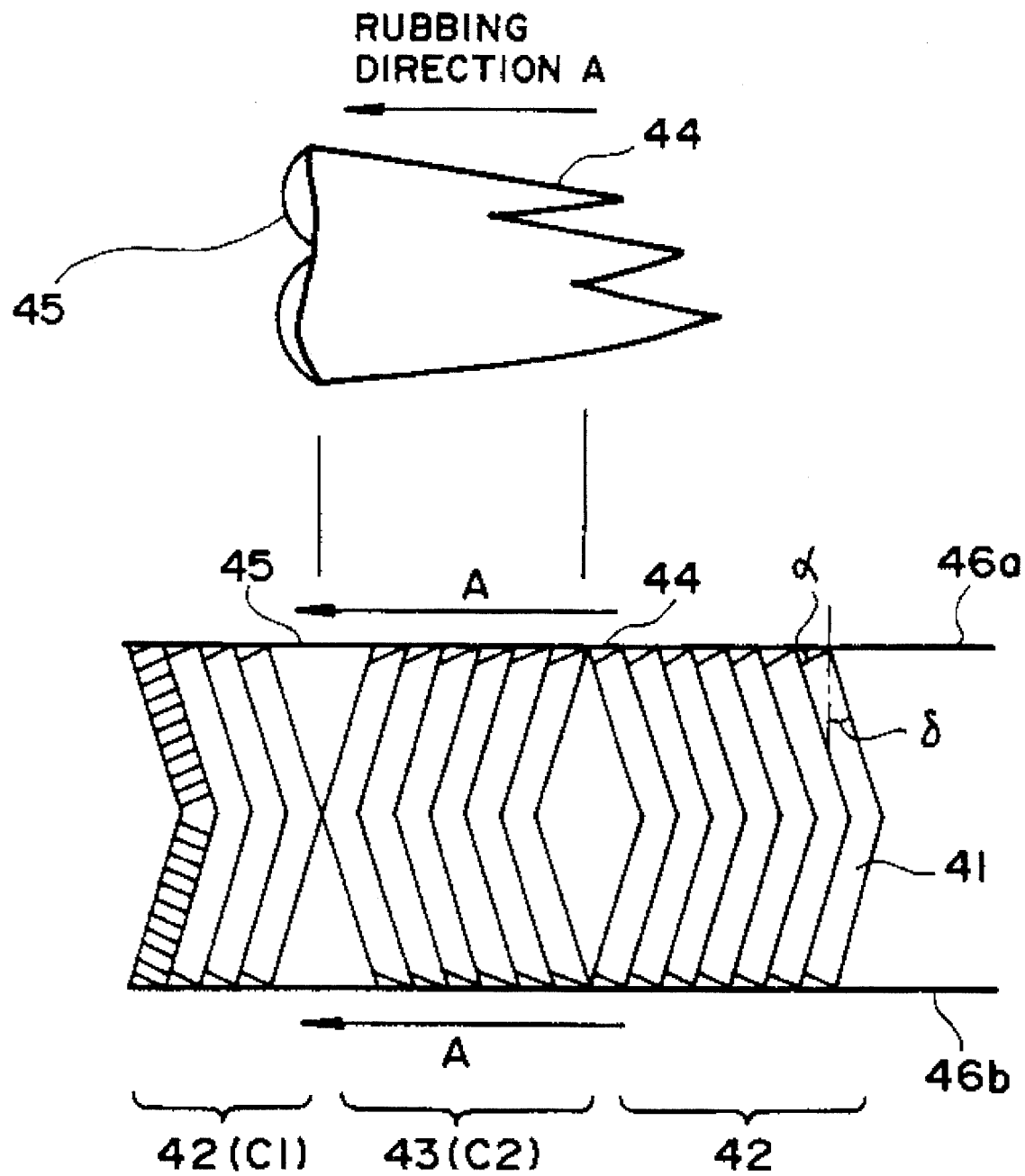
F I G. 2

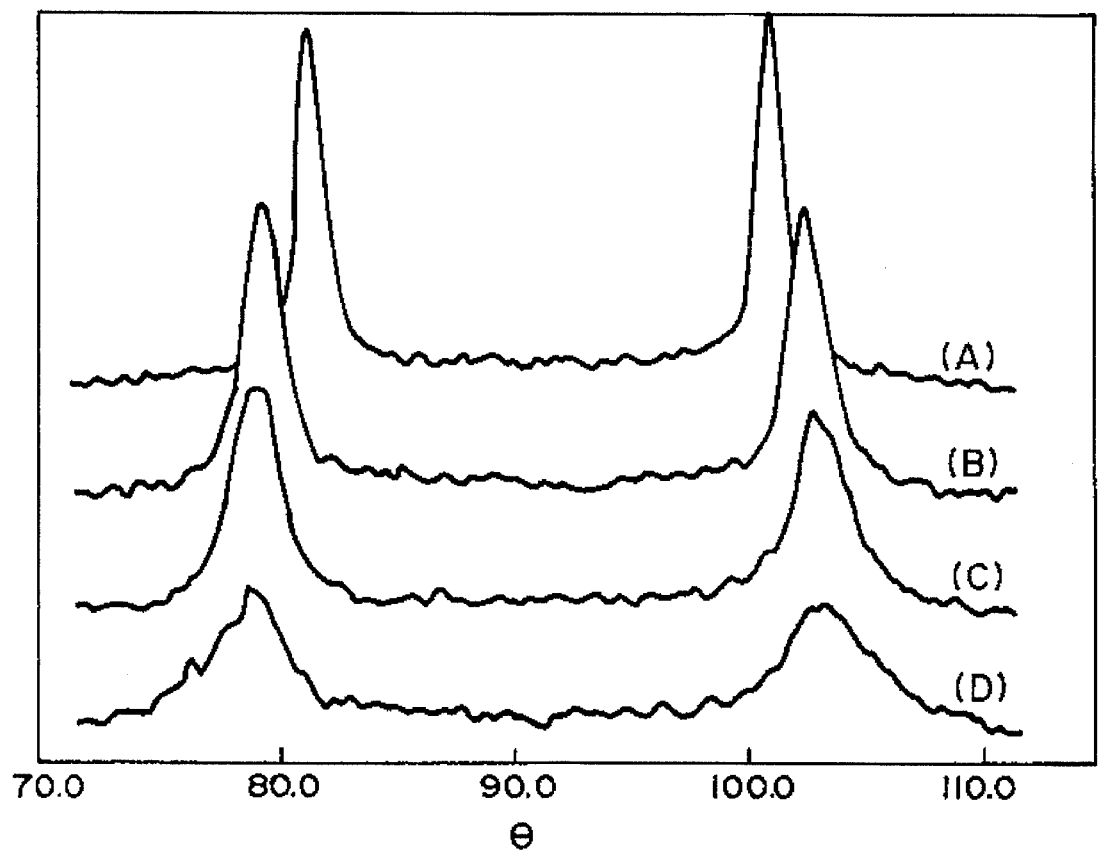
F I G. 7A
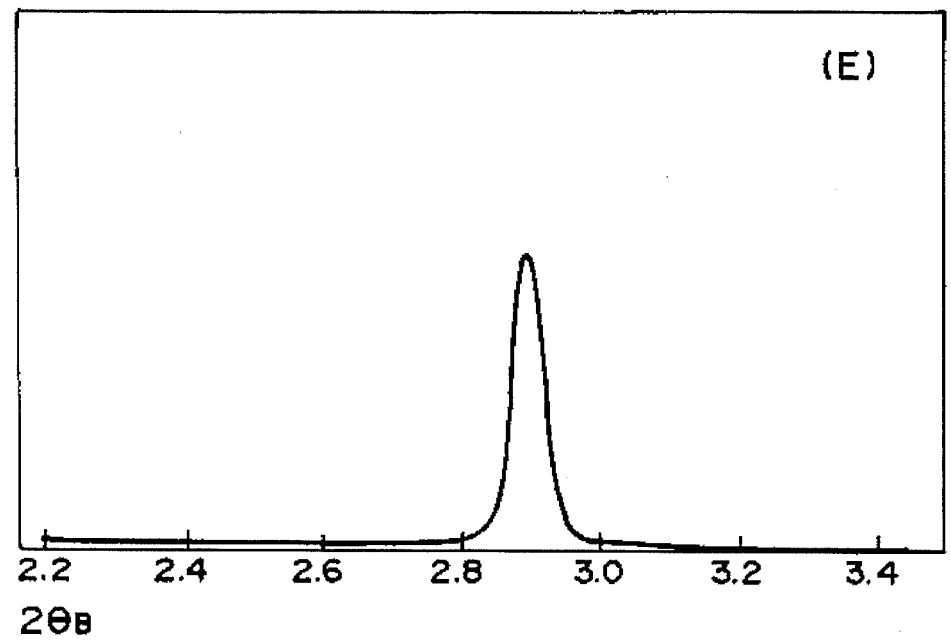
F I G. 7B

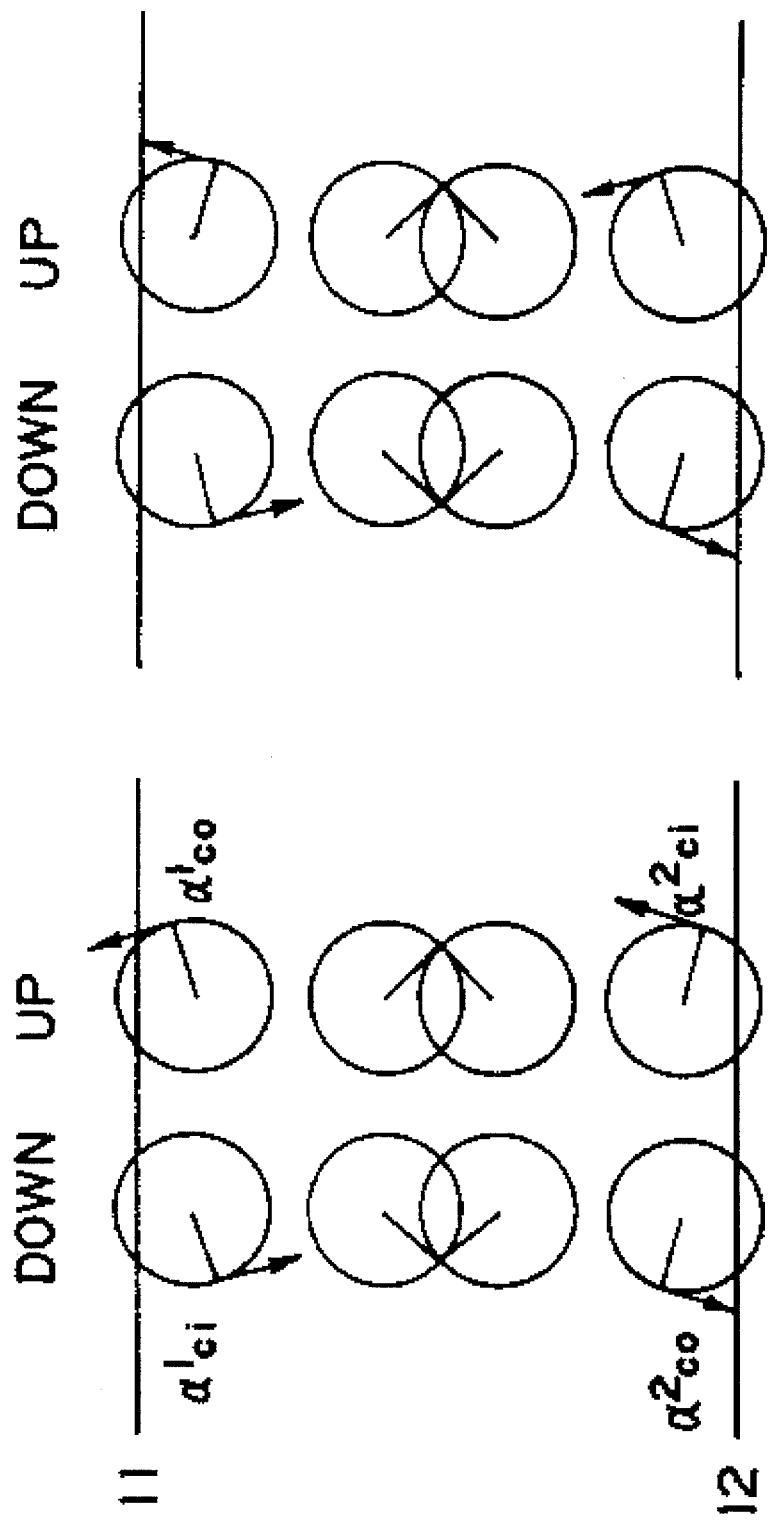

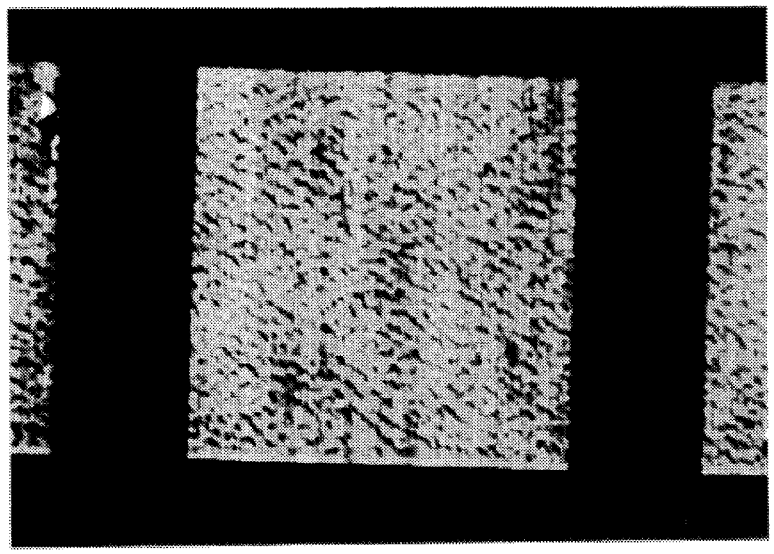
F I G. 10
F I G. 11

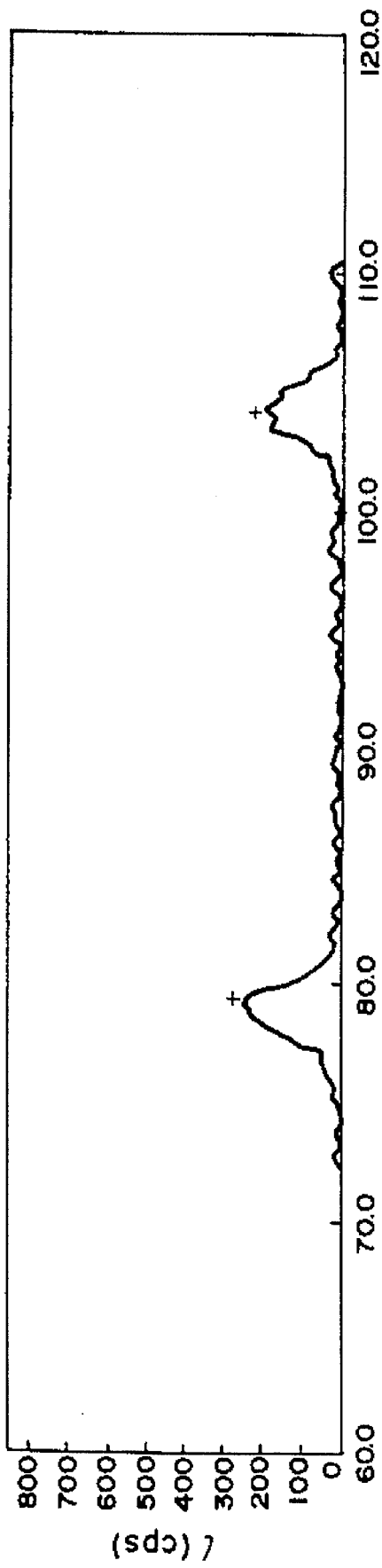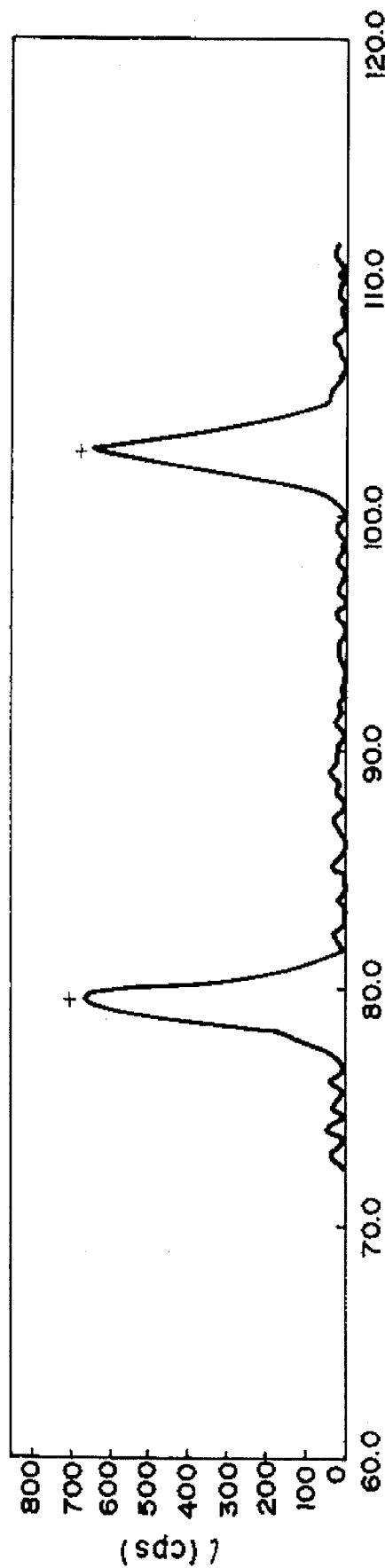

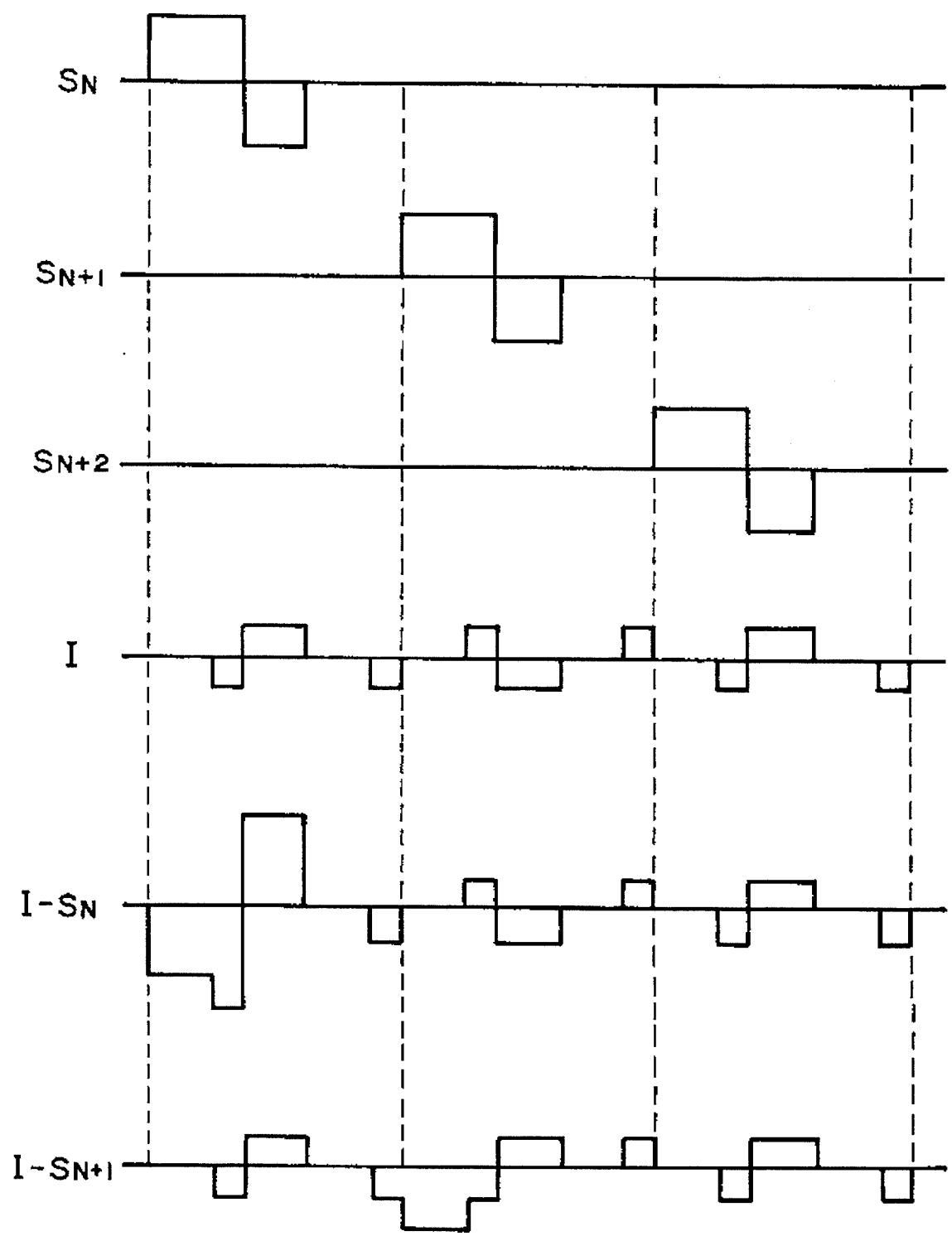
F I G. 19

CHIRAL SMECTIC DEVICE SUBJECTED TO A SIMULTANEOUS THERMAL AND AC FIELD TREATMENT

This application is a continuation of application Ser. No. 08/007,794, filed Jan. 22, 1993, now abandoned.

FIELD OF THE INVENTION AND RELATED ART

The present invention relates to a ferroelectric liquid crystal device and a treatment method therefor, more particularly to a ferroelectric liquid crystal device substantially free from deterioration even in a long period of continual drive and a treatment method therefor.

A display device of the type which controls transmission of light in combination with a polarizing device by utilizing the refractive index anisotropy of ferroelectric liquid crystal molecules has been proposed by Clark and Lagerwall (U.S. Pat. No. 4,367,924, etc.). The ferroelectric liquid crystal has generally chiral smectic C phase (SmC*) or H phase (SmH*) of a non-helical structure and, under this state, shows a property of taking either one of a first optically stable state and a second optically stable state responding to an electrical field applied thereto and maintaining such a state in the absence of an electrical field, namely bistability, and also has a rapid response to the change in electrical field. Thus, it is expected to be utilized in a high speed and memory type display device and particularly to provide a large-area, high-resolution display.

However, there has been found a problem that, when such a ferroelectric liquid crystal device of a cell structure is continually driven for a long time, the thickness along a cell side is gradually increased to show a pale yellow tint (yellowing).

SUMMARY OF THE INVENTION

In view of the above problems, an object of the present invention is to provide a ferroelectric liquid crystal device wherein the increase in cell thickness along a cell side is minimized.

Another object of the present invention is to provide a ferroelectric liquid crystal device substantially free from the yellowing of a display due to a cell thickness increase.

According to the present invention, there is provided a treatment method for a ferroelectric liquid crystal device, comprising:

providing a ferroelectric liquid crystal device comprising a ferroelectric liquid crystal and a pair of substrates sandwiching the ferroelectric liquid crystal and each substrate having thereon an electrode for applying a voltage to the ferroelectric liquid crystal, the pair of substrates being provided with uniaxial alignment axes in directions which are substantially identical so as to provide a pretilt angle α of at least 10 degrees between a substrate boundary and liquid crystal molecules adjacent to the boundary; and applying an AC electric field to the ferroelectric liquid crystal.

According to another aspect of the present invention, there is provided a treatment method for a ferroelectric liquid crystal device, comprising:

providing a ferroelectric liquid crystal device comprising a ferroelectric liquid crystal and a pair of substrates sandwiching the ferroelectric liquid crystal and each substrate having thereon an electrode for applying a voltage to the ferroelectric liquid crystal, the pair of substrates being provided with uniaxial alignment axes in directions which are substantially identical so as to provide a pretilt angle α of at least 10 degrees between a substrate boundary and liquid crystal molecules adjacent to the boundary; and heating and cooling the ferroelectric liquid crystal in its smectic temperature range.

The present invention further provides a ferroelectric liquid crystal device, comprising: a ferroelectric liquid crystal and a pair of substrates sandwiching the ferroelectric liquid crystal and each substrate having thereon an electrode for applying a voltage to the ferroelectric liquid crystal, the pair of substrates being provided with uniaxial alignment axes in directions which are substantially identical so as to provide a pretilt angle α of at least 10 degrees between a substrate boundary and liquid crystal molecules adjacent to the boundary; wherein said liquid crystal is provided with a layer structure showing a diffraction peak area (or half-value width) which is at least 70% of (or at most 1.5 times) that of the liquid crystal contained in a device which is identical to the above-mentioned device except for having an alignment control film comprising a polyimide represented by the following structural formula:

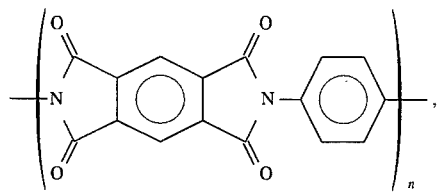

n: positive integer.

The present invention further provides a ferroelectric liquid crystal device, comprising: a ferroelectric liquid crystal and a pair of substrates sandwiching the ferroelectric liquid crystal and each substrate having thereon an electrode for applying a voltage to the ferroelectric liquid crystal, the pair of substrates being covered with alignment control films of a polymer rubbed in directions which are substantially identical so as to provide a pretilt angle α of at least 10 degrees between a substrate boundary and liquid crystal molecules adjacent to the boundary; wherein said liquid crystal is provided with a layer structure providing a diffraction peak area (or half-value width) of at least 9000 cps (or at most 2.5 degrees) when measured with respect to a liquid crystal cell prepared in an equivalent manner, i.e., by providing a 80 μm-thick glass plate, coating the glass plate sequentially with a 1500 Å-thick indium tin-oxide film, a 900 Å-thick insulating film and a 200 Å-thick alignment control film of the same polymer and rubbing the alignment control film, applying the thus treated glass plate and another glass plate treated identically to each other to form a cell so as to provide a pretilt angle of at least 10 degrees, and filling the cell with the same ferroelectric liquid crystal in a liquid crystal layer thickness of 1.5 μm, under X-ray diffraction conditions including:

X-ray output power: 15 kW (=50 kV×30 mA), divergence slit: 0.5 degree, scanning slit: 0.5 degree, light-receiving slit: 0.15 mm, sampling angle: 0.05 degree, scanning speed: 10 deg/min, analyzing rays: copper Kα rays, and irradiation area: 8.0×1.8 mm² as measured in case of the X-rays being incident perpendicularly to the glass substrate.

The present invention further provides a ferroelectric liquid crystal device, comprising: a ferroelectric liquid crystal and a pair of substrates sandwiching the ferroelectric liquid crystal and each substrate having thereon an electrode for applying a voltage to the ferroelectric liquid crystal, the pair of substrates being provided with uniaxial alignment axes in directions which are substantially identical so as to provide a pretilt angle α of at least 10 degrees between a substrate boundary and liquid crystal molecules adjacent to the boundary; wherein said liquid crystal is provided with a layer structure including smectic layers which are disposed at a constant layer spacing between the substrates.

The present invention further provides a ferroelectric liquid crystal device, comprising: a pair of a first substrate and a second substrate having thereon scanning electrodes and data electrodes, respectively, and each substrate provided with a uniaxial alignment axis, and a ferroelectric liquid crystal disposed between the substrates, wherein said ferroelectric liquid crystal is placed in an alignment state such that liquid crystal molecules in the vicinity of a substrate boundary are oriented to have an inward or outward dipole moment depending on an electric field direction applied thereto, liquid crystal molecules in the vicinity of each substrate boundary show a substantially equal pretilt angle regardless of whether they have an inward or outward spontaneous polarization direction, and the liquid crystal molecules in the vicinity of the first substrate and the liquid crystal molecules in the vicinity of the second substrate show a substantially equal pretilt angle regardless of their spontaneous polarization direction.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A and 1B are explanatory views for illustrating a cell thickness increase along a cell side in relation with liquid crystal movement directions.

FIG. 2 is an explanatory view for illustrating an alignment state occurring in a chiral smectic liquid crystal used in the invention.

FIGS. 7A and 7B are diagrams showing X-ray diffraction patterns.

FIG. 9 is a schematic illustration showing C-director arrangements at various positions between the substrates in the uniform alignment state utilized in the present invention.

FIG. 10 is a microscopic photograph (×250) showing an alignment of a ferroelectric liquid crystal obtained by gradual cooling from isotropic phase.

FIG. 11 is a microscopic photograph (×250) showing an alignment of a ferroelectric liquid crystal subjected to the treatment method according to the present invention.

FIGS. 12A and 12B are X-ray diffraction diagrams showing a layer structure change.

FIG. 19 is a waveform diagram showing a set of driving signal waveforms used in an Example of the present invention.

DESCRIPTION OF THE PREFERRED EMBODIMENTS

Figure 4:
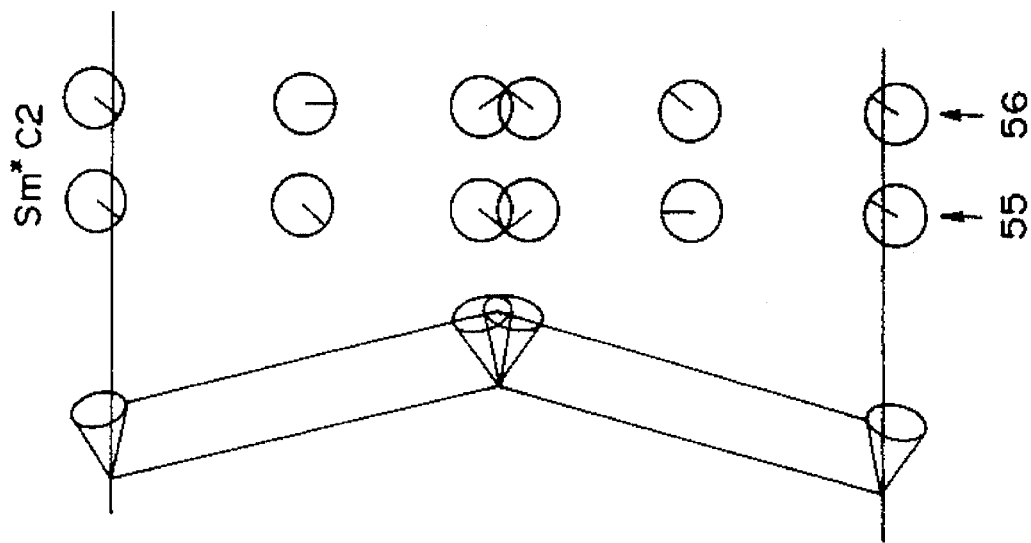
FIGS. 3 and 4 are explanatory views for illustrating changes in director orientation according to various positions between substrates in C1 alignment and C2 alignment, respectively.

According to our study, the increase in cell thickness at a cell side is recognized to be caused by a pressure increase which in turn is caused by movement of liquid crystal molecules in a particular direction due to driving. Presumably, such a force causing the liquid crystal molecule movement may be attributable to an electrodynamic effect caused by perturbation of liquid crystal molecule dipole moments in an AC-like electric field caused by continuation of drive pulses.

Further, according to our experiments, the directions 62a and 62b of the liquid crystal movement are determined in relation with the rubbing direction 60 and the average liquid crystal molecular axis position 61a or 61b as shown in FIG. 1A. As the moving direction of liquid crystal molecules is related with the rubbing direction, the above-mentioned phenomenon is assumed to depend on the pretilt state at the substrate surfaces. Referring to FIGS. 1A and 1B, reference numeral 61a (or 61b in a reverse orientation state) denotes an average molecular axis (director) orientation. When the liquid crystal molecules (described herein as having a negative spontaneous polarization) are oriented to provide the average molecular axis 61a and are supplied with a certain strength of AC electric field not causing a switching to the orientation state 61b, the liquid crystal molecules are liable to move in the direction of an arrow 62a in the case where the substrates are provided with rubbing axes extending in parallel and in the same direction 60.

The direction of the liquid crystal movement can be different depending on the liquid crystal material and the liquid crystal cell conditions. In an actual liquid crystal cell, the liquid crystal movement occurs as shown in FIG. 1A. For example, when the liquid crystal molecules in the entire cell are placed in a state providing an average molecular axis direction 61a, the liquid crystal molecules in the cell are liable to move under AC application in the direction of the arrow 62a, i.e., from the right to the left in the figure. As a result, the cell thickness in a region 63 is increased gradually to show a yellowish tint. If the liquid crystal molecules are placed in a state providing an average molecular axis 61b, the liquid crystal movement under AC application is caused in the reverse direction 62b. In either case, the liquid crystal movement is caused in a direction perpendicular to the rubbing direction, i.e., in the direction of extension of smectic layers. Accordingly, it is assumed that a state of the smectic layer structure is a factor of the liquid crystal movement. The liquid crystal movement adversely affects the durability as a display device of a liquid crystal device in a long term of continuous drive. Further, this liquid crystal movement phenomenon depends on an alignment state in the cell. More specifically, this phenomenon hardly occurs in C2 alignment but is remarkably observed in C1 alignment and uniform alignment described hereinafter.

The two alignment states C1 and C2 may be explained by a difference in chevron structure of smectic layers as shown in FIG. 2. Referring to FIG. 2, reference numeral 41 denotes a smectic layer showing ferroelectricity, 42 denotes a C1 alignment region, and 43 denotes a C2 alignment region. A smectic liquid crystal generally has a layer structure and causes a shrinkage of layer pitch when it is transformed from SmA (smectic A) phase into SmC (smectic C) phase or SmC* (chiral smectic C) phase, to result in a structure accompanied with a bending of layers between the upper and lower substrates 46a and 46b (chevron structure) as shown in FIG. 2. The bending of the layers 41 can be caused in two ways corresponding to the C1 and C2 alignment as shown. As is well known, liquid crystal molecules at the substrate surfaces are aligned to form a certain angle $\alpha$ or $\alpha_C$ (pre-tilt) as a result of rubbing in a direction A in such a manner that their heads (leading ends) in the rubbing direction are up (or away) from the substrate surfaces 46a and 46b. Because of the pre-tilt, the C1 and C2 alignment states are not equivalent to each other with respect to their elastic energy and a transition between these states can be caused at a certain temperature or when supplied with a mechanical stress. When the layer structure shown in FIG. 2 is viewed in plan as shown in the upper part of FIG. 2, a boundary 44 of transition from C1 alignment (42) to C2 alignment (43) in the rubbing direction A looks like a zigzag lightning and is called a lightning defect, and a boundary 45 of transition from C2 alignment (43) to C1 alignment (42) forms a broad and moderate curve and is called a hairpin defect.

When FLC is disposed between a pair of substrates 46a and 46b and placed in an alignment state satisfying a relationship of $$\text{(H)} < \alpha_C + \delta \quad (1),$$

wherein $\alpha_C$ denotes a pretilt angle of the FLC, (H) denotes a tilt angle (a half of cone angle), and $\delta$ denotes an angle of inclination of SmC* layer, there are four states each having a chevron structure in the C1 alignment state. These four C1 alignment states are different from the known C1 alignment state. Further, two among the four C1 alignment states form bistable states (uniform alignment). Herein, two states among the four C1 states giving an apparent tilt angle $\theta_a$ therebetween in the absence of an electric field satisfying a relationship of $$\text{(H)} > \theta_a > \text{(H)}/2 \quad (2)$$

are inclusively referred to as a uniform state.

Figure 3:
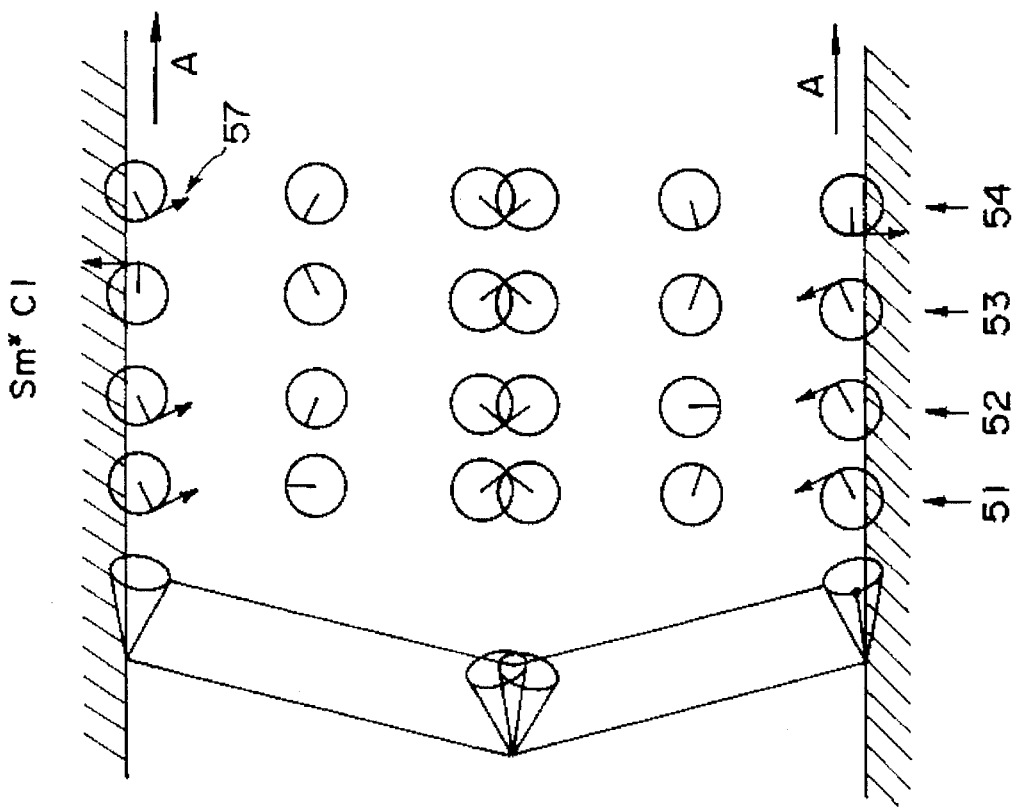

In the uniform state, the directors are believed to be not twisted between the substrates in view of optical properties thereof. FIG. 3 is a schematic view illustrating director positions between the substrates in the respective states in C1 alignment. More specifically, at 51–54 are respectively shown changes in director positions between the substrates in the form of projections of directors onto cone bottoms as viewed from each bottom. At 51 and 52 is shown a splay state, and at 53 and 54 is shown a director arrangement which is believed to represent a uniform alignment state. As is understood from FIG. 3, at 53 and 54 representing a uniform state, the molecule position (director) is different from that in the splay state either at the upper substrate or lower substrate. Arrows 57 represent the dipole moment (µs) of liquid crystal molecules at the boundary, and an arrow A represents a rubbing direction. FIG. 4 shows two states in C2 alignment between which no switching is observed at the boundaries but an internal switching is observed. The uniform state in C1 alignment provides a larger tilt angle $\theta_a$ and thus a higher brightness and a higher contrast than the conventionally used bistable state in C2 alignment.

We have studied in detail about a relationship between the above-mentioned liquid crystal movement and the smectic layer structures in the SmC* phase. As a result, we have discovered that the liquid crystal movement is liable to occur in a state accompanied with a disorder of the layer structure while the detailed mechanism has not been clarified as yet. More specifically, we have found that a large torque causing liquid crystal movement is exerted in an alignment state wherein the uniformity of layer spacing is not retained within or among layers. This point is explained further hereinbelow.

Figure 5A:
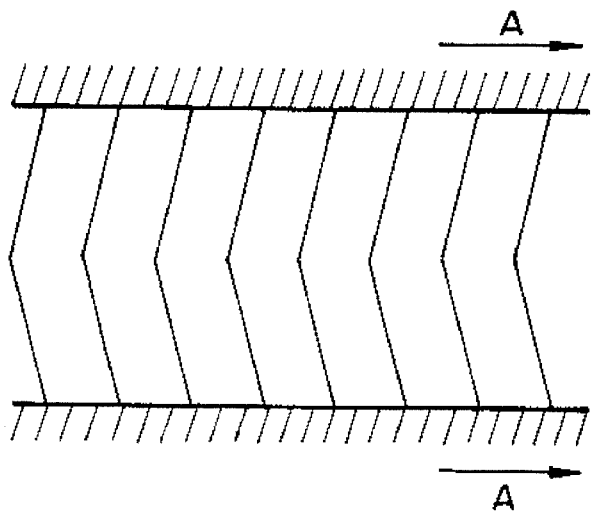
FIGS. 5A and 5B are schematic sectional views of smectic layer structures utilized in the present invention.
Figure 5B:
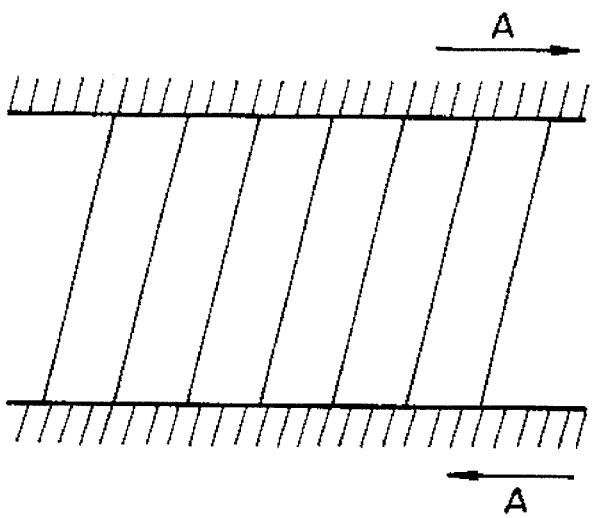

FIGS. 5A and 5B schematically show smectic layer structures of liquid crystal cells having a relatively small pretilt angle $\alpha_C$ of about 2 degrees and subjected to parallel rubbing and anti-parallel rubbing, respectively. In such low pretilt angle cells, it is assumed that layer structures are uniformly formed. That is, the layer spacing is assumed to be substantially uniform within and among the layers.

Figure 6:
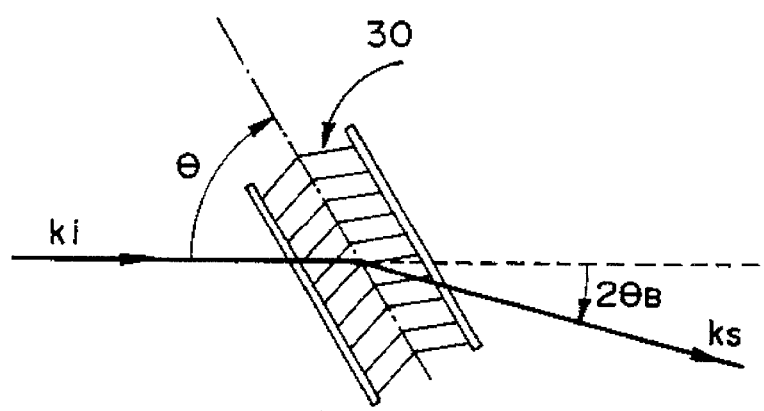
FIG. 6 is an illustration of an X-ray diffraction method for analyzing the smectic layer structure.

The uniformity of a layer structure can be evaluated by an X-ray diffraction method as described in, e.g., Physical Review Letters, Volume 59, No. 23, 2658 (1987). FIG. 6 is an illustration of the measurement system with an optical arrangement, including a cell 30 as an object of measurement to which incident X-rays having a wave number vector ki enter at an incident angle or cell rotation angle θ and from which scattered X-rays having a wave number vector ks are issued at a Bragg angle $2\theta_B$.

The Bragg angle $2\theta_B$ may be obtained by measuring an angle corresponding to a scattering center of scattered X-rays detected by a detector while changing the position of the detector.

FIG. 7B shows a curve (E) as an example chart of X-ray diffraction intensity versus the rotation angle of a detector. In the state not confined in a cell, a liquid crystal assumes a layer structure in its inherent bulk state in a random direction. As a result, a sharp peak is detected at an angle satisfying the Bragg condition, i.e., at a Bragg angle $2\theta_B$. The peak provides a half-value width or full width at half maximum (FWHM) $\Gamma_0$ which is almost constant unless the factors affecting the accuracy of the measurement system, such as the slit width, are not changed and thus can be used as a reference of half-value width of diffraction peaks. Accordingly, the uniformity or homogeneity of a layer structure of a liquid crystal in the state of being confined in a cell can be evaluated in terms of a ratio of the half-value width of its diffraction peak to the reference value $\Gamma_0$.

A curve (A) in FIG. 7A represents a result of measurement of diffraction intensity (arbitrary scale) versus cell rotation angle θ with respect to a low-pretilt angle cell as described above. The measurement condition is the same as the curve (E) except that the detector position is fixed at $2\theta_B$ and the cell is rotated. Hereinbelow, a specific example of such a low-pretilt angle cell (referred to as "cell A") will be described.

A glass substrate provided with transparent electrodes was coated with tantalum oxide by sputtering and then coated with 1% NMP (N-methylpyrrolidone)-solution of polyamide acid ("LP64", available from Toray K.K.), followed by baking at 270° C. for 1 hour and rubbing. This substrate and another substrate treated in the same manner were applied to each other to form a blank cell. The cell showed a pretilt angle of 2.5 degrees as measured by the crystal rotation method. The blank cell was then filled with a mixture ferroelectric liquid crystal containing a phenylpyrimidine as a principal constituent having a tilt angle of 15 degrees at room temperature, a layer inclination angle of 10 degrees at room temperature and showing the following phase transition series:

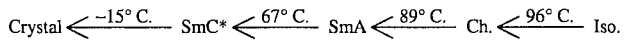

The liquid crystal cell did not satisfy the above-mentioned relationship (1) and provided C2 alignment as described above. The half-value width of X-ray diffraction peak was about 1.4 degrees as shown in the curve (A) in FIG. 7A, which was about 28 times the above-mentioned reference value $\Gamma_0$. Thus, the liquid crystal in the cell showed a considerable difference in order of layer structure from that in its bulk state.

However, the diffraction peak given by the cell A showed the sharpest diffraction peak at a good reproducibility at least among a large number of cells measured by us, and substantially no alignment defect causing a disorder of layer structure was found.

Accordingly, a homogeneous layer structure retaining a substantially constant layer spacing as shown in FIG. 5A was realized in the cell A, and the half-value width of an X-ray diffraction peak given by the cell A may be used as another reference value $\Gamma_1$.

Other experiments of ours show that cells having a pretilt angle of at most 5 degrees and realizing a homogeneous alignment provide almost identical half-value width of X-ray diffraction peaks.

On the other hand, curves (B)–(D) represent X-ray diffraction peaks given by cells of an identical structure having an alignment film providing a high pretilt angle of, e.g., 10 degrees or higher. The half-value width of these diffraction peaks may be denoted by $\Gamma_h$. A relationship between these half-value widths of X-ray diffraction peaks and the above-mentioned liquid crystal moving velocity will be described with reference to Examples and Comparative Examples appearing hereinafter.

Then, an explanation is made to the direction of a dipole moment μs given by a liquid crystal molecule in the vicinity of a substrate boundary with reference to Sm*C1 alignment as shown in FIG. 3. In the splay alignments as shown at 51 and 52 in FIG. 3, the liquid crystal molecular dipole moments 57 at the upper and lower substrate boundaries are both directed from a substrate toward the liquid crystal layer, and this direction may be called "inward". However, in the uniform alignments shown at 53 and 54 in FIG. 3, the dipole moment of a liquid crystal molecule at one substrate boundary (lower boundary at 53 and upper boundary at 54) is the same direction as at 51 and 52 but the dipole moment of a liquid crystal molecule at the other substrate boundary (upper boundary at 53 and lower boundary at 54) is directed from the liquid crystal layer toward the substrate. This direction may be called "outward".

Further, a conventional device generally has provided an alignment state wherein liquid crystal molecules giving outward and inward dipole moments provide different pretilt angles as shown in FIG. 3. In other words, an alignment state giving different pretilt angles depending on dipole moment directions has been generally realized because the interaction between a substrate boundary and a liquid crystal molecule in the vicinity of the substrate boundary is different depending on the dipole moment direction of the liquid crystal molecule.

We have studied in detail about a relationship about the above-mentioned liquid crystal movement and the pretilt angle $\alpha_C$ in SmC* phase. As a result, we have found phenomena that the liquid crystal movement can also be caused by a difference in pretilt angle in the vicinity of upper and lower substrate boundaries. More specifically, we have found that, in an alignment accompanied with an asymmetry of pretilt angles, a torque for moving liquid crystal molecules occurs when AC drive pulses are applied.

This point will be described with reference to the above-mentioned C1 uniform alignment as an example. Herein, some symbols are defined with respect to pretilt angles. That is, in SmC* phase, $\alpha^1_{Ci}$ and $\alpha^1_{Co}$ are used to denote pretilt angles given by liquid crystal molecules have inward and outward dipole moments, respectively, in the vicinity of an upper substrate. Similarly, symbols $\alpha^2_{Ci}$ and $\alpha^2_{Co}$ are used to denote pretilt angles given by liquid crystal molecules in the vicinity of a lower substrate.

Further, $\alpha^1_A$ and $\alpha^2_A$ are used to denote pretilt angles given by liquid crystal molecules in the vicinity of an upper substrate and a lower substrate, respectively, in SmA phase.

At (A)–(C) of FIG. 8 are shown various alignment states represented by C directors and dipole moments of liquid crystal molecules in the vicinity of upper and lower substrates and at a bending in the chevron structure with respect to various orientations of UP and DOWN regarding spontaneous polarizations Ps. In the figure, the magnitude of each pretilt angle $\alpha_C$ is represented by the length of a perpendicular line to an upper or lower substrate from an intersection of a C-director with a circle representing the projection of a cone.

Figure 8A:
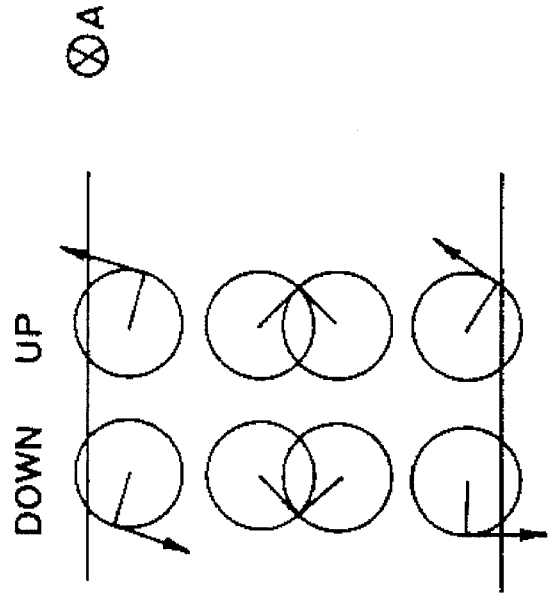
FIG. 8 is a schematic illustration showing C-director arrangements at various positions between the substrates in uniform alignment states.

FIG. 8(A) represents a case where an identical aligning treatment is applied to both an upper substrate 11 and a lower substrate 12. In this case $\alpha^1_A = \alpha^2_A$ in SmA phase but, in SmC* phase, the pretilt angles are generally different between the upper and lower substrates due to a difference in direction of dipole moment μs. For example, in case where a high pretilt angle is given for outward μs, an asymmetry of pretilt angle is developed such that $\alpha^2_{Co} > \alpha^1_{Ci}$ for Ps=DOWN and $\alpha^1_{Co} > \alpha^2_{Ci}$, Ps=UP, and a liquid crystal moving torque corresponding to the difference is considered to occur under application of an AC electric field. In this case, from the fact of $\alpha^1_A = \alpha^2_A$, the difference is equal to $|\alpha^1_{Ci} - \alpha^2_{Co}| = |\alpha^1_{Co} - \alpha^2_{Ci}|$, and the liquid crystal moving torques are identical between the UP and DOWN states of Ps. It has been also confirmed experimentally that the liquid crystal movement is caused almost identically in both states under AC application.

FIG. 8(A) shows a case of $\alpha^1_A < \alpha^2_A$ as developed by, e.g., by rubbing upper and lower substrates under different conditions. As the pretilt angles are asymmetrical between the upper and lower substrates already in SmA phase, the pretilt angles are different not only corresponding to the difference between inward μs and outward μs but also corresponding to the difference between UP and DOWN of Ps in SmC* phase unlike a symmetry as observed in FIG. 8(A). As a result if $|\alpha^1_A - \alpha^2_A|$ is adequately controlled, an alignment state satisfying the following relationship (1) can be realized:

$$|\alpha^1_{Ci} - \alpha^2_{Co}| > |\alpha^1_{Co} - \alpha^2_{Ci}| \approx 0 \quad (1).$$

In this case, the liquid crystal movement is remarkable in the state of Ps=DOWN but is not substantially caused in the state of Ps=UP. This has been experimentally confirmed.

Figure 8B:
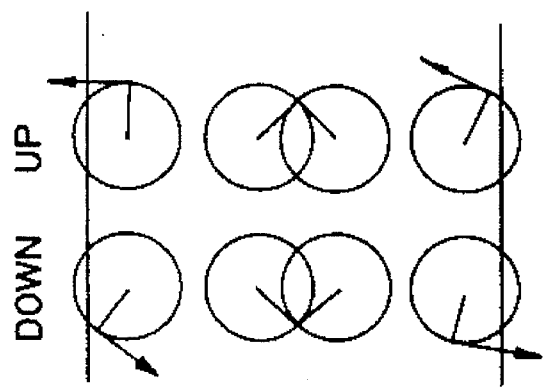
Figure 8C:
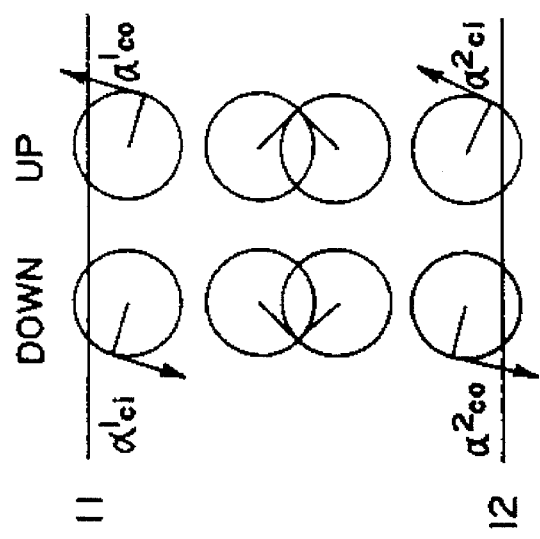

FIG. 8(C) refers to a case of $\alpha^1_A > \alpha^2_A$ opposite to the case of FIG. 8(B). In a similar discussion as in the case of FIG. 8(B), an alignment state satisfying the following relationship (2) can be realized if $|\alpha^1_A - \alpha^2_A|$ is adequately controlled:

$$|\alpha^1_{Co} - \alpha^2_{Ci}| > |\alpha^1_{Ci} - \alpha^2_{Co}| \approx 0 \quad (2).$$

In this case, the liquid crystal movement is remarkable in the state of Ps=UP but is not substantially caused in the state of Ps=DOWN.

As described above, the experimental results showed a good correspondence with the model explained as above. From this, it has been confirmed that a static alignment state including an asymmetry of pretilt angle between the upper and lower substrate is a factor of causing liquid crystal movement under application of an electric field. Accordingly, it is necessary to provide a symmetry of pretilt angle between upper and lower substrates in order not to cause a liquid crystal moving torque.

FIG. 9(A) shows an example of alignment state giving a symmetry of pretilt angle between upper and lower substrates. Such an alignment state can be realized, e.g., by different alignment films for the upper and lower substrates. More specifically, if the alignment conditions are adequately set so that the upper substrate 11 shows a high pretilt angle for inward µs and the lower substrate 12 shows a high pretilt angle for outward µs, the following conditions can be established:

$$\alpha^1 = \alpha^2_{Co}$$

and $$\alpha^1_{Co} = \alpha^2_{Ci}.$$

In the alignment state satisfying the above conditions, no liquid crystal movement is caused as is understood from the above discussion, but the state of Ps=DOWN and the state of Ps=UP are not equivalent with respect to elastic energy, thus lacking bistability and providing the state of Ps=UP as a monostable state. This is not desirable in view of drive characteristics of a display device.

From the above, an alignment state shown in FIG. 9(B) is preferred in order to satisfy both the prevention of liquid crystal movement and the bistability. More specifically, FIG. 9(B) shows an alignment state wherein an identical pretilt angle is given for both inward and outward µs and also for both the upper and lower substrate. That is, $$\alpha^1_{Ci} = \alpha^1_{Co} = \alpha^2_{Ci} = \alpha^2_{Co}.$$

In order to realize such an alignment, it is considered to be necessary that the pretilt angle in SmC* phase is not substantially affected by a dipole moment in the vicinity of a substrate boundary and a symmetry of pretilt angle is satisfied between the upper and lower substrates. From this, in the alignment state, the following relationship (3) is considered to be satisfied:

$$\alpha^1_{CA} = \alpha^2_A = \alpha^1_{Ci} = \alpha^1_{Co} = \alpha^2_{Ci} = \alpha^2_{Co} \quad (3).$$

In order to realize an alignment state satisfying the above formula (3), the following factors (i)–(iv) have been found experimentally effective.

(i) To use a liquid crystal material having a small spontaneous polarization Ps, e.g., at most 10 nC/cm$^2$.

(ii) To apply a realigning treatment of causing a sequential phase transition of SmC*→SmA→SmC*.

(iii) To apply an appropriate AC electric field in the course of cooling from isotropic phase or the course of the realigning treatment in (ii).

(iv) To use an alignment film causing weak electrical interaction with liquid crystal molecules, such as that of polyparaphenylene.

Accordingly, in a preferred embodiment of the present invention, an AC application treatment is applied to a ferroelectric liquid crystal cell showing a pretilt angle of at least 10 degrees between a substrate boundary and a liquid crystal molecule in the vicinity of the substrate boundary. In the course of the AC application, it is further preferred to subject the cell (device) to a temperature change, particularly a temperature increase and/or decrease within the smectic phase, so as to realize a homogeneous alignment capable of reducing the liquid crystal movement.

For example, FIG. 10 is a microscopic photograph (magnification=250) showing an alignment state obtained by mere gradual cooling of a cell from isotropic phase at a rate of $-4°$ C./min. and including wrinkle-like alignment defects, and FIG. 11 is a microscopic photograph (magnification= 250) showing an alignment state obtained by subjecting the cell to a treatment under the following conditions. FIG. 11 shows that the wrinkle alignment defects shown in FIG. 10 have been removed:

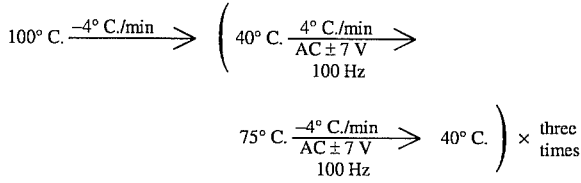

The cell before the treatment provided an X-ray diffraction pattern shown in FIG. 12A giving parameters of $\theta_1 = 78.95$ degrees ($\delta_1 = 12.55$ degrees), $\theta_2 = 103.70$ degrees ($\delta_2 = 12.2$ degrees), FWHM$_1 = 2.25$ degrees, and FWHM$_2 = 2.75$ degrees. Herein, $\theta_1$ ($\theta_2$) denotes a first (second) diffraction peak angle, $\delta_1$ ($\delta_2$) denotes a layer inclination angle corresponding to the first (second) diffraction peak, and FWHM$_1$ (FWHM$_2$) denotes a half-value width or full width at half maximum of the first (second) diffraction peak.

The cell after the treatment provided an X-ray diffraction pattern shown in FIG. 12B giving parameters of $\theta_1 = 79.35$ degrees ($\delta_1 = 12.15$ degrees), $\theta_2 = 102.55$ degrees ($\delta_2 = 11.05$ degrees), FWHM$_1 = 1.90$ degrees, and FWHM$_2 = 1.85$ degrees.

The increase in integrated intensity of a diffraction peak shows that a degree of order of layer structure has been increased. Further, a smaller half-value width of a peak shows that the layer structure has been converted into one with a clearer chevron structure.

Figure 13:
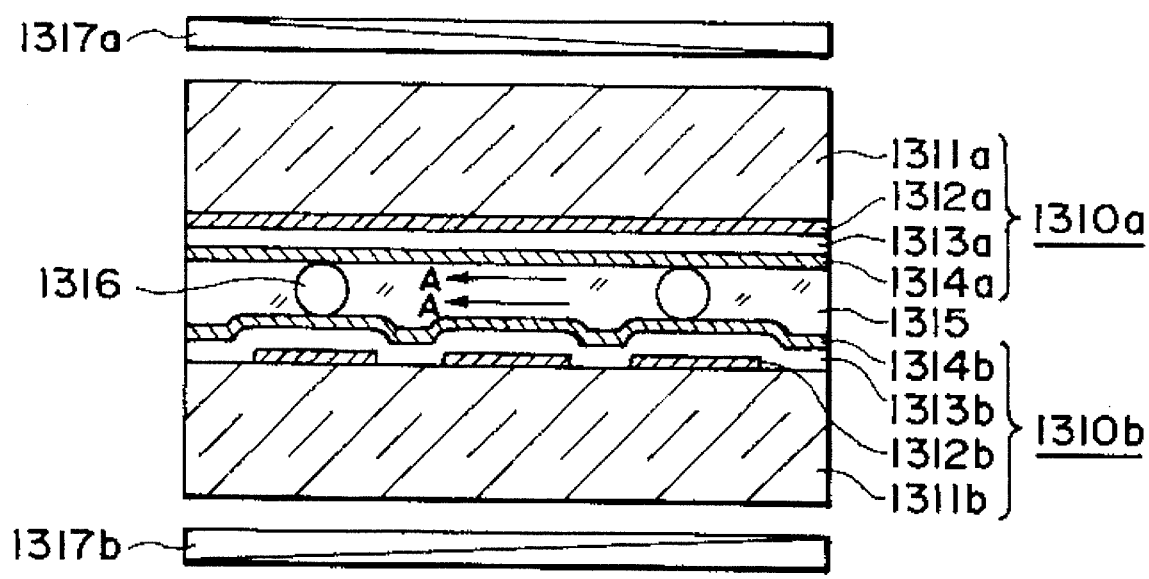
FIG. 13 is a schematic sectional view of a liquid crystal device utilized in the present invention.

A basic structure of the ferroelectric liquid crystal device (cell) according to the present invention will now be described with reference to FIG. 13 showing an embodiment thereof.

Referring to FIG. 13, the liquid crystal cell includes a pair of an upper substrate 1311a and a lower substrate 1311b disposed in parallel with each other and provided with, e.g., about 400–3000 Å-thick transparent electrodes 1312a and 1312b. Between the upper substrate 1311a and the lower substrate 1311b is disposed a ferroelectric liquid crystal 1315. The transparent electrodes 1312a and 1312b may be coated with, e.g., 10 to 3000 Å-thick insulating films 1313a and 1313b. The insulating films may comprise an inorganic oxide of a coating-baking type or a sputtering film, or may comprise a laminate film of two or more layers. Above the insulating films 1313a and 1313b are formed alignment control films 1314a and 1314b in a thickness of ordinarily 50–1000 Å. The alignment control films may ordinarily comprise a film of a polymer, preferably a film providing a high pretilt angle, such as that of a fluorine-containing polyimides, in the present invention. The pretilt angle may preferably be 10–30 degrees. Such polymer films may be rubbed as an aligning treatment.

In case of rubbing both substrates, it is possible to rub both substrates in directions intersecting at an angle in the range of 0–20 degrees. This is effective for stabilizing the uniform states as shown at 53 and 54 in FIG. 3 to provide a higher contrast. In the present invention, the ferroelectric liquid crystal 1315 may be in chiral smectic phase, inclusive of chiral smectic C phase (Sm*C), H phase (Sm*H), I phase (Sm*I), K phase (Sm*K) or G phase (Sm*G).

A particularly preferred class of liquid crystals may be those showing cholesteric phase on a higher temperature side, including a pyrimidine-based mixture crystal showing the following phase transition series and physical properties.
Pyrimidine-based liquid crystal A

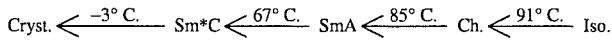

cone angle $\textcircled{H}$=14 degrees layer inclination angle δ=11 degrees apparent tilt angle θa=11.5 degrees Incidentally, the above-mentioned parameters (cone angle $\textcircled{H}$, layer inclination angle δ apparent tilt angle $\theta_a$ and pretilt angle α) were measured according to the following methods.
Measurement of cone angle $\textcircled{H}$ An FLC (ferroelectric liquid crystal) device was sandwiched between right-angle-cross nicol polarizers and rotated horizontally relative to the polarizers under application of a DC voltage of 10–30 volts between the upper and lower substrates to find a first extinction position (a position providing the lowest transmittance), and then a DC voltage of a polarity opposite to the above DC voltage is applied between the substrates to find a second extinction position. A cone angle $\textcircled{H}$ was measured as a half of the angle between the first and second extinction positions.
Measurement of apparent tilt angle $\theta_a$ An FLC device sandwiched between right angle cross nicol polarizers was supplied with a single pulse of one polarity exceeding the threshold voltage of the ferroelectric liquid crystal and was then rotated under no electric field horizontally relative to the polarizers to find a first extinction position. Then, the FLC device was supplied with a single pulse of the opposite polarity exceeding the threshold voltage of the ferroelectric liquid crystal and was then rotated under no electric field relative to the polarizers to find a second extinction position. An apparent tilt angle $\theta_a$ was measured as a half of the angle between the first and second extinction positions.
X-ray diffraction analysis of smectic layer structure Smectic layer structures were analyzed by an X-ray diffraction method.

The measurement method was basically similar to the one reported by Clark and Lagerwall (Japan Display '86, Sep. 30–Oct. 2, 1986, pp. 456–458) or the one reported by Ohuchi et al (J.J.A.P., 27 (5) (1988) pp. 725–728). In the method, a liquid crystal layer spacing was measured by applying a sample liquid crystal on a glass plate, subjecting the sample liquid crystal to 2θ/θ scanning similarly as in the ordinary powder X-ray diffraction and then applying the Bragg equation to the measured value. Then, the layer structure of the sample liquid crystal in a cell structure is analyzed by fixing the X-ray detector at a diffraction angle 2θ corresponding to the measured layer spacing and subjecting the sample cell to θ-scanning as reported in the above-mentioned method.

A sample liquid crystal cell may for example be prepared by providing a 80 μm-thick glass plate, coating the glass plate sequentially with a 400 to 3000 Å-thick (e.g., 1500 Å-thick) indium-tin-oxide film, a 100 to 3000 Å-thick (e.g., 900 Å-thick) insulating film and a 50 to 1000 Å-thick (e.g., 200 Å-thick) alignment control film of the same polymer and rubbing the alignment control film, applying the thus treated glass plate and another glass plate treated identically to each other to form a cell so as to provide a pretilt angle of, e.g., at least 10 degrees, and filling the cell with the sample ferroelectric liquid crystal in a liquid crystal layer thickness of 1.5 μm.

A rotating anticathode-type X-ray diffraction apparatus (e.g., "MXP-18", available from MAC Science Co.) was used. The X-ray diffraction conditions included the following:

X-ray output power: 15 kW (=50 kV×300 mA), divergence slit: 0.5 degree, scanning slit: 0.5 degree, light-receiving slit: 0.15 mm, sampling angle: 0.05 degree, scanning speed: 10 deg/min, analyzing rays: copper Kα rays, and irradiation area: 8.0×1.8 mm² as measured in case of the X-rays being incident perpendicularly to the glass substrate. The irradiation area was determined by the cell holder and a slit. The background removal was effected by using the Sonneveld method.

Measurement of pretilt angle α

The measurement was performed according to the crystal rotation method as described at Jpn. J. Appl. Phys. vol. 19 (1980), No. 10, Short Notes 2013.

More specifically, a pair of substrates rubbed in mutually parallel and opposite directions were applied to each other to form a cell having a cell gap of 20 μm, which was then filled with a liquid crystal mixture (A) assuming SmA phase in the temperature range of 0°–60° C. For measurement, the liquid crystal cell was rotated in a plane perpendicular to the pair of substrates and including the aligning treatment axis and, during the rotation, the cell was illuminated with a helium-neon laser beam having a polarization plane forming an angle of 45 degrees with respect to the rotation plane in a direction normal to the rotation plane, whereby the intensity of the transmitted light was measured by a photodiode from the opposite side through a polarizer having a transmission axis parallel to the polarization plane.

An angle $\phi_x$ between a normal to the cell and the incident beam direction for providing the central point of a family of hyperbolic curves in the interference figure thus obtained was substituted in the following equation to find a pretilt angle $\alpha_o$, $$\sin 2\alpha_o = \frac{-2\sin\phi_x}{(n_o + n_e)\sqrt{1 - (\sin\phi_x/n_o)^2}}$$

wherein $n_o$ denotes the refractive index of ordinary ray, and $n_e$ denotes the refractive index of extraordinary ray.

EXAMPLE 1

A glass substrate provided with transparent electrodes was coated with a tantalum oxide film by sputtering and then coated with 1% NMP-solution of polyamide acid ("LQ1802", available from Hitachi Kasei K.K.), followed by baking at 270° C. for 1 hour and rubbing. This substrate and another substrate treated in the same manner were applied to each other with a cell gap of 1.5 μm so that their rubbing directions were almost identical but formed a right-screw intersection angle of about 10 degrees between the upper and lower substrates. The cell showed a pretilt angle of 17 degrees according to the crystal rotation method. The cell was then filled with the same mixture liquid crystal as used in the above-mentioned cell A, and the resultant cell was gradually cooled from isotropic phase at a rate of –4° C./min. Then, the cell was subjected to three cycles of a realigning treatment of heating to SmA phase (75° C.) followed by re-cooling to SmC* phase (40° C.), respectively at a rate of 4° C. while applying alternating rectangular waveforms of 100 Hz and ±10 volts to obtain a desired alignment state. The resultant cell is referred to as cell B. The cell showed an apparent tilt angle θa of about 11 degrees, thus satisfying the above-mentioned relationships (1) and (2) and showing homogeneous C1 uniform alignment.

The curve (B) in FIG. 7A represents an X-ray diffraction pattern of the cell B, thus showing a sharp diffraction peak comparable with that of the cell A and a half-value width $\Gamma_h$ of about 1.9 degrees. Further, as a result of alignment observation through a polarizing microscope, substantially no alignment defects due to disorder of layer structure were detected. Accordingly, similarly as the cell A, a homogeneous layer structure retaining a substantially constant layer spacing as shown in FIG. 5A was confirmed.

A liquid crystal display device (cell) having a sectional structure as shown in FIG. 13 may be formed similarly as in the above Example. The liquid crystal cell include substrates (glass plates) 1311a and 1311b provided with transparent electrodes 1312a and 1312b of, e.g., $In_2O_3$ or ITO (indium tin oxide), which are further coated with 200 to 3000 Å-thick insulating films 1313a and 1313b of, e.g., $SiO_2$, $TiO_2$ and $Ta_2O_5$, and 50 to 1000 Å-thick alignment control films 1314a and 1314b of a polyimide providing a high pretilt angle as described above. The alignment control films 1314a and 1314b have been rubbed in directions which are identical but intersect each other at a mutually right-screw angle of 3–20 degrees.

Between the substrates 1311a and 1311b is disposed a ferroelectric smectic liquid crystal 1315 in a thickness which is sufficiently small (e.g., 0.1–3 μm) to suppress the formation of a helical structure of the ferroelectric liquid crystal and place the ferroelectric liquid crystal 1315 in a bistable alignment state. The liquid crystal layer thickness is held by spacer beads 1316 of, e.g., silica oralumina. The entire cell structure is held between a pair of polarizers 1317a and 1317b to provide a panel having a display area of 114 mm×228 mm.

In a specific example, a panel thus prepared was subjected to the above-mentioned realigning treatment and the alignment in the cell was brought to one providing an average molecular axis direction 61 shown in FIG. 1A. Then, the panel was subjected to continual application of rectangular pulses of a pulse width of 24 μs, a voltage amplitude of 40 volts and a duty ratio of 1/2 for about 7 hours. As a result of measurement of the cell thickness increase at the region 63 in FIG. 18, the increase was only about 5% with respect to the initial value.

EXAMPLE 2

A cell of the same structure as the cell B was, after being gradually cooled from isotropic phase, subjected to several cycles of a realigning treatment of heating into SmA phase followed by recooling to Sm*C phase in the same manner as in Example 1 to obtain a cell C. The cell C provided an X-ray diffraction pattern (C) in FIG. 7A. The diffraction peak was somewhat broader ($\Gamma_h$=2.4 degrees) than that of the cell A but the alignment observation showed only some alignment defects, suggesting an almost homogeneous layer structure. When a panel identical to the one used in Example 1 was subjected to the same realigning treatment as the cell C and subjected to a similar drive test, whereby the cell thickness increase was only about 10% with respect to the initial value.

COMPARATIVE EXAMPLE 1

Figure 14A:
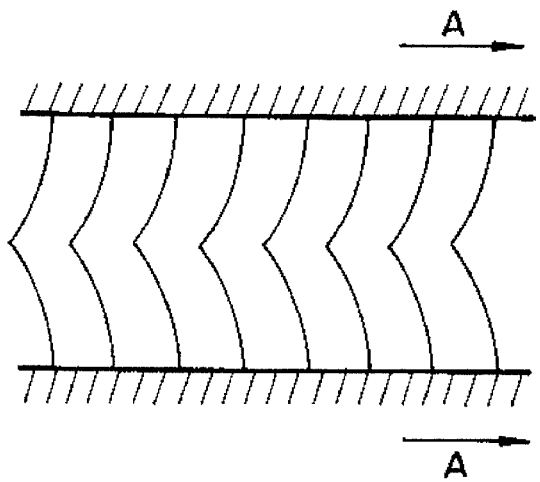
FIGS. 14A–14C are schematic sectional views showing various smectic layer structures.
Figure 14B:
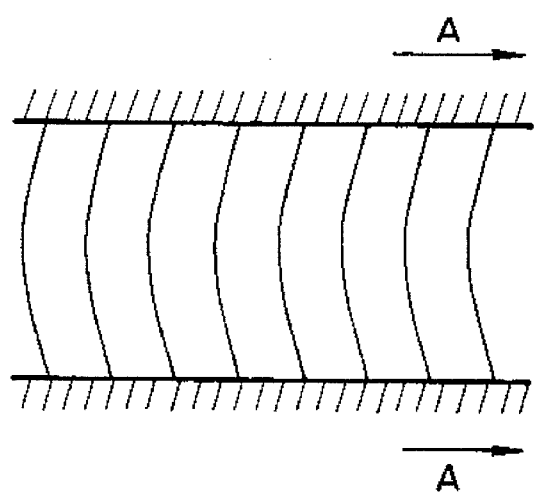
Figure 14C:
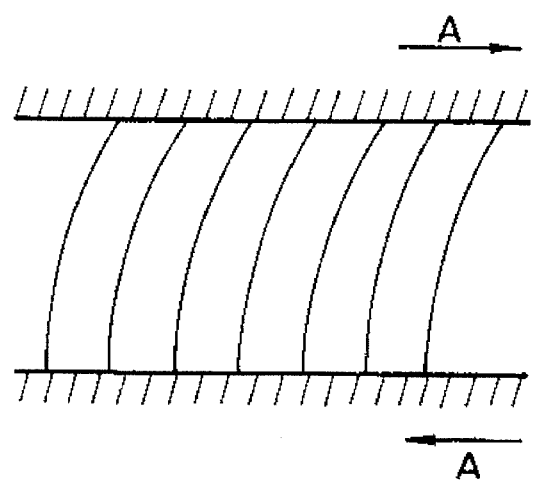

A cell of the same structure as the cell B was gradually cooled from isotropic phase to provide a cell D without a realigning treatment. The cell D provided an X-ray diffraction pattern (D) in FIG. 7A showing a diffraction peak ($\Gamma_h$=3.6 degrees) substantially broader than that of the cell A. The broadness of the diffraction peak means that the order of smectic layer structure is lowered in some way. This may be attributable to a phenomenon that the liquid crystal in the state of being gradually cooled from isotropic phase is strongly affected by the substrate boundaries to cause a curving of the smectic layers as shown in FIGS. 14A and 14B, but detailed mechanisms have not yet been clarified.

Figure 15:
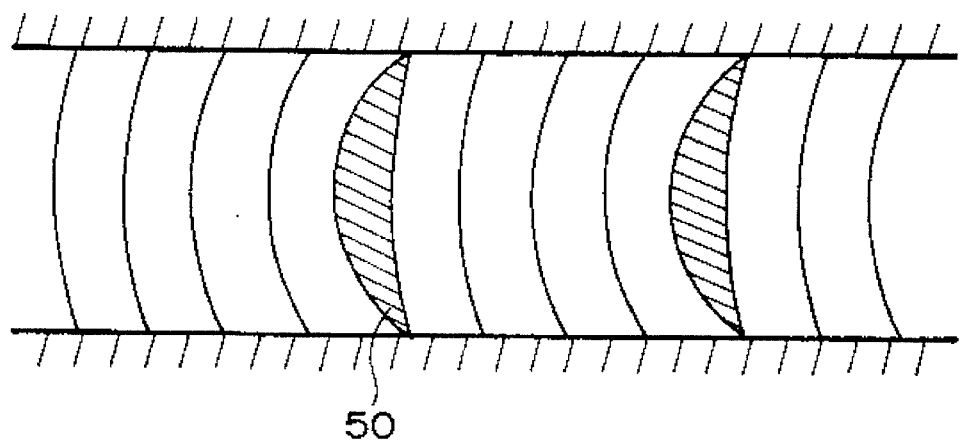
FIG. 15 in a schematic sectional view of a smectic layer structure for illustrating alignment defects.

As a result of the alignment observation, many alignment defects attributable to disorder in layer structure were detected. Such alignment defects might be attributable to a phenomenon that the curving or bending of layers so as to keep the layer spacing to be locally constant caused disalignments or alignment defects as denoted by reference numeral 50 in FIG. 15, but details have not been clarified as yet.

When a panel of the same structure as in Example 1 was subjected to a similar drive test without any realigning treatment likewise the cell D, the resultant cell thickness increase amount to about 30% with respect to the initial value.

The characteristic values of the cells A–D and the results of measurement cell thickness increase are summarized in the following Table 1.

TABLE 1

| | Hall-value width $\Gamma_h$ (deg.) | $\Gamma_h/\Gamma_0$ | $\Gamma_h/\Gamma_1$ | Cell-thickness increase (%) |
|---|---|---|---|---|
| Bulk state | 0.05 (*$_0$) | — | — | — |
| Cell A | 1.4 | 28 | 1 | 0 |
| Cell B (Ex. 1) | 1.9 | 38 | 1.4 | 5 |

TABLE 1-continued

| | Hall-value width $\Gamma_h$ (deg.) | $\Gamma_h/\Gamma_0$ | $\Gamma_h/\Gamma_1$ | Cell-thickness increase (%) |
|---|---|---|---|---|
| Cell C (Ex. 2) | 2.4 | 48 | 1.7 | 10 |
| Cell D (Comp.Ex.1) | 3.6 | 72 | 2.6 | 30 |

EXAMPLE 3

Figure 16:
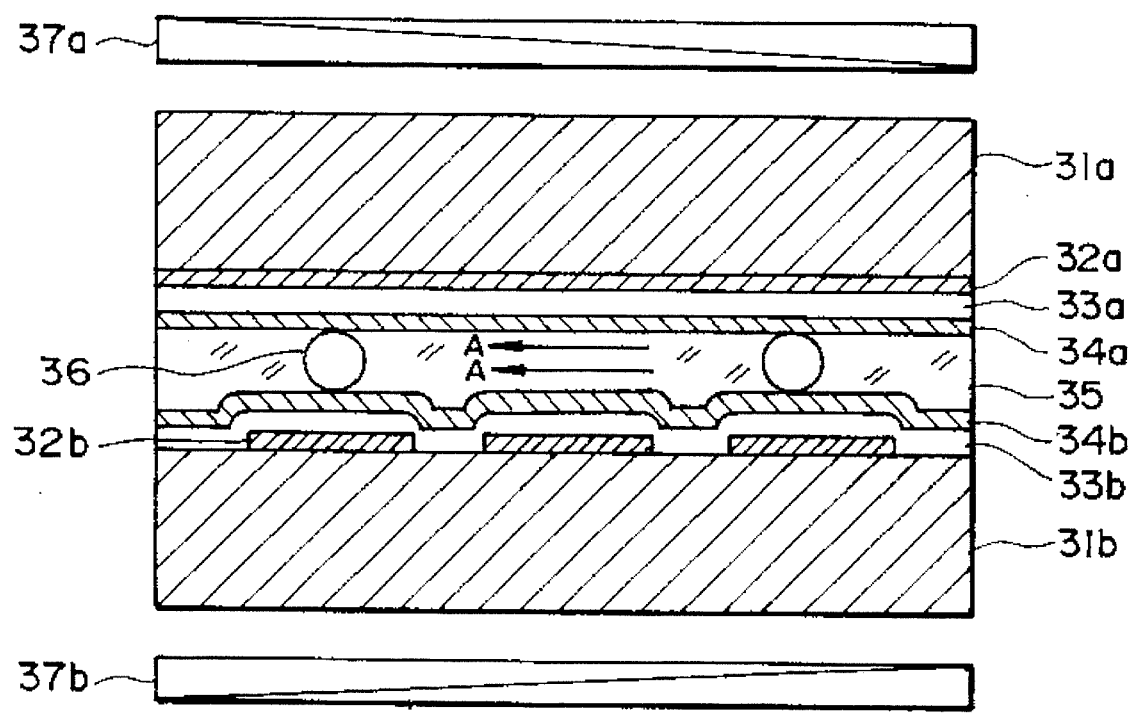
FIG. 16 is a schematic sectional view of an embodiment of the liquid crystal device according to the invention.

FIG. 16 is a sectional view showing another suitable embodiment according to the present invention. Referring to FIG. 16, the liquid crystal cell includes a pair of an upper substrate 31a and a lower substrate 31b disposed in parallel with each other and provided with about 400 to 2000 Å-thick transparent electrodes 32a and 32b. Between the upper substrate 31a and the lower substrate 31b is disposed a ferroelectric liquid crystal 35, preferably a ferroelectric smectic liquid crystal placed in a non-helical structure providing at least two stable states. The transparent electrodes 32a and 32b are covered with alignment control films 34a and 34b of, e.g., 10 to 1000 Å-thick films of a polymer, such as a polyimide. The alignment control films 34a and 34b have been rubbed in directions which are parallel and identical to each other. It is also possible to have the rubbing directions intersect each other at an angle of 5–20 degrees. It is also possible to insert, e.g., 200 to 3000 Å-thick insulating films 33a and/or 33b of, e.g., $SiO_2$, $TiO_2$ or $Ta_2O_5$, between the alignment control films 34a, 34b and the transparent electrodes 32a, 32b. The spacing between the substrates is held by, e.g., silica beads of, e.g., about 1.5 µm (generally, 0.1–3.5 µm) in average diameter, dispersed within the liquid crystal layer 35. Herein, the upper substrate 31a and the lower substrate 31b have been subjected to an equivalent aligning treatment so as to develop effectively equal pretilt angles.

The ferroelectric liquid crystal 35 may be in chiral smectic phase, more specifically chiral smectic C phase (Sm*C), H phase (Sm*H) or I phase (Sm*I).

A particularly preferred class of liquid crystals may be those showing cholesteric phase on a higher temperature side, including a pyrimidine-based mixture crystal showing the following phase transition series and physical properties.

$$\text{Cryst.} \xleftarrow{-6° C.} \text{Sm*C} \xleftarrow[55° C.]{54° C.} \text{SmA} \xleftarrow[78° C.]{77° C.} \text{Ch.} \xleftarrow[84° C.]{85° C.} \text{Iso.}$$

cone angle ⒣=14 degrees spontaneous polarization Ps=4 nC/cm$^2$ layer inclination angle δ=10 degrees apparent tilt angle θa=11 degrees In a Specific example, a liquid crystal cell prepared in the above-described manner by using the pyrimidine-based mixture liquid crystal was gradually cooled from isotropic phase, and then subjected to a re-aligning treatment including re-heating into SmA phase and then re-cooling into Sm*C phase under application of alternating rectangular waves of 100 Hz and ±10 volts in the same manner as in Example 1 to obtain a desired alignment state.

Various pretilt angles were measured according to the TIR (total inner reflection) method described in, e.g., Appl. Phys. Lett. Vol. 53, No. 24, 2397 (1988).

The measured cell had a structure comprising a hemispherical prism of a high refractive index in place of the upper substrate 31a in the cell shown in FIG. 16, to measure a pretilt angle $\alpha_A$ in SmA phase and pretilt angles $\alpha_{Ci}$ and $\alpha_{Co}$ in Sm*C phase for inward and outward dipole moments, respectively, of liquid crystal molecules in the vicinity of a liquid crystal boundary contacting the hemispherical prism. The pretilt angles showed a relatively small temperature-dependence and satisfied a relationship of $\alpha_A=\alpha_{Ci}\alpha_{Co}=19$ degrees at least within the temperature range of $T_{AC}\pm3°$ C. wherein $T_{AC}$ denotes an SmA→Sm*C phase transition temperature.

The alignment state satisfied the above-mentioned relationships (1) and (2), thus providing C1 uniform alignment.

The alignment in a liquid crystal cell prepared in the above-described manner was entirely brought to an orientation providing an average molecular axis direction 61 and subjected to continual application of rectangular pulses of a pulse width of a voltage amplitude of 40 volts and a duty of 1/2 for about 7 hours. As a result of measurement of the cell thickness at the region 63 in FIG. 1B, the cell thickness increase was only about 5% with respect to the initial value. The bistability was also very good.

COMPARATIVE EXAMPLE 2

A cell of the same structure as in Example 3 was prepared and gradually cooled from isotropic phase, followed by no realigning treatment.

A cell in the above alignment state was subjected to measurement of pretilt angles in the same manner as in Example 3, thereby to obtain results of $\alpha_{Co}>\alpha_{Ci}$, $\alpha_{Co}-\alpha_{Ci}=3$ degrees, and $\alpha_A=(\alpha_{Co}+\alpha_{Ci})/2$.

The above cell was subjected to continual voltage application in the same manner as in Example 3, whereby the cell thickness increase amounted to about 30% with respect to the initial value.

EXAMPLE 4

A glass substrate measuring 7.5 cm×7.5 cm and provided with transparent electrodes was coated with a tantalum oxide film by sputtering and then coated with 1% NMP-solution of a fluorine-containing polyimide precursor, followed by baking at 270° C. for 1 hour and rubbing. This substrate and another substrate treated in the same manner were applied to each other with a cell gap of 1.5 µm therebetween to form a cell, so that their rubbing directions were almost identical but formed an intersection angle of a right-screw or clockwise screw (as viewed from above the cell) of 10 degrees. The cell showed a pretilt angle of 20 degrees according to the crystal rotation method. The cell was filled with a phenylpyrimidine-based mixture liquid crystal showing a cone angle of degrees at room temperature, a layer inclination angle of 12 degrees, and the following phase transition series:

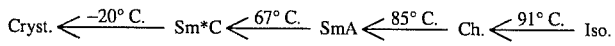

Figure 17:
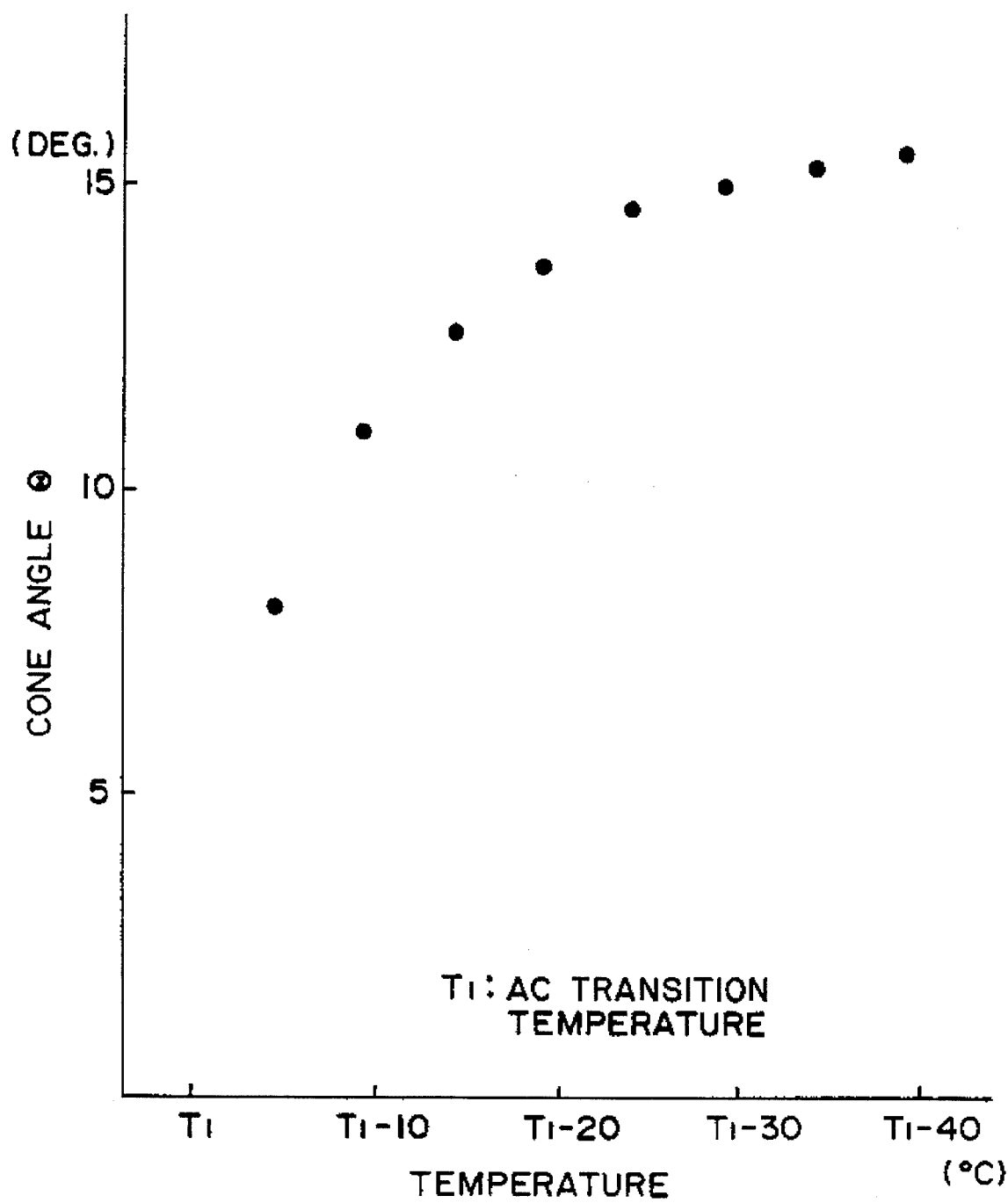
FIG. 17 is a graph showing a temperature-dependence of cone angle of a liquid crystal used in an Example of the present invention.

FIG. 17 shows the temperature-dependence of the cone angle (H) of the liquid crystal by using a temperature scale normalized with the AC phase-transition temperature (67° C.) of the liquid crystal.

The liquid crystal cell was aged for 5 hours at 100° C. and then subjected to the following series of cooling—realigning treatment:

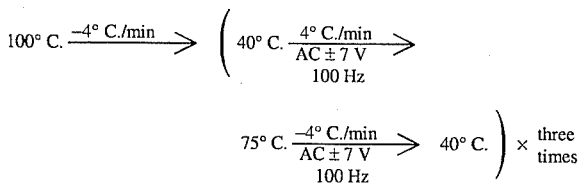

C1 alignment was retained and electric field switching between uniform states was possible over the entire temperature range of Sm*C. Experiments were thereafter carried out at 30° C. The apparent tilt angle θa under the condition was 11.5 degrees.

Figure 18:
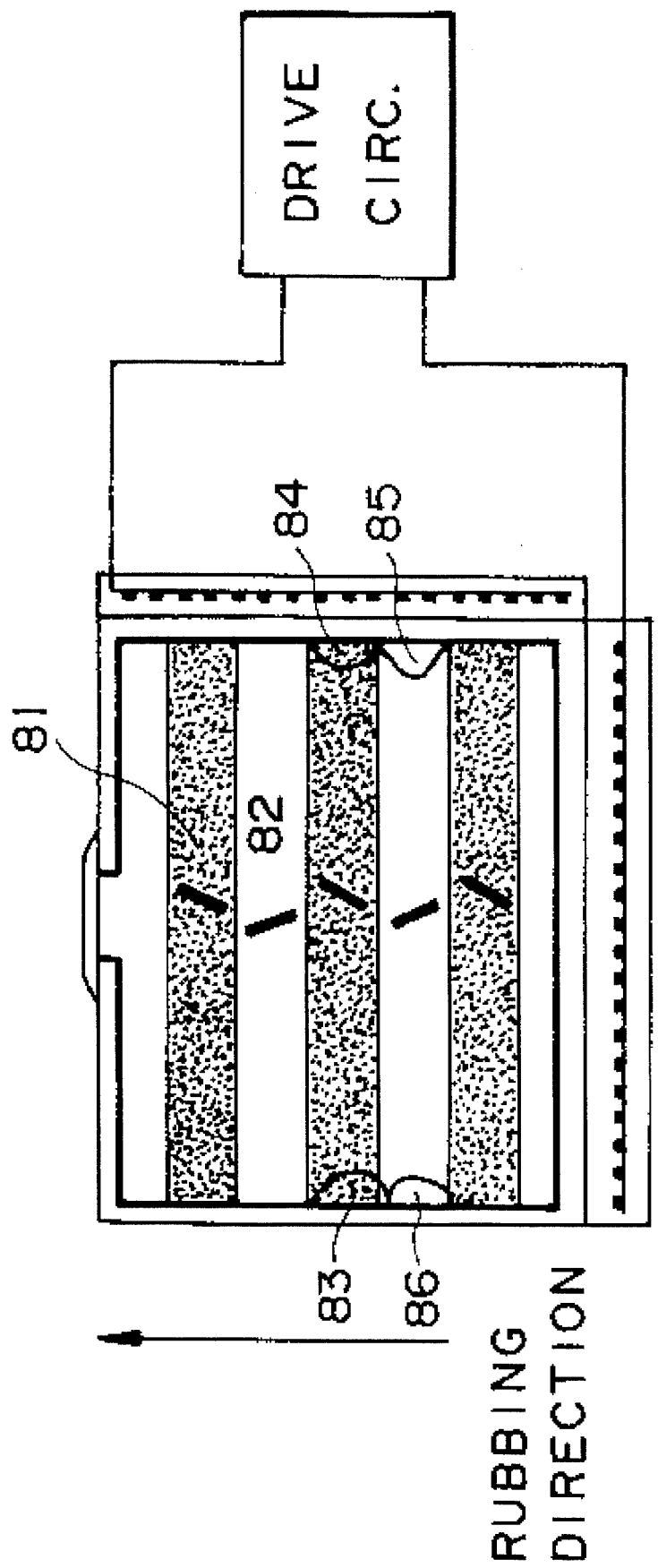
FIG. 18 is a schematic view for illustrating an alignment used in an Example of the present invention.

Then, the cell was brought to orientations 81 and 82 as shown in FIG. 18 and the entire cell was subjected to application of a set of driven waveforms shown in FIG. 19 (Vop=25 volts, Δt=25 μs) for about 7 hours. Thereafter, the cell thickness change (%) at the regions 83–86 in FIG. 18 was measured with respect to the initial value. The results are shown in the following Table 2.

TABLE 2

| Region | 83 | 84 | 85 | 86 |
|---|---|---|---|---|
| Cell-thickness change | +2% | −1% | 0% | 0% |

The cell was sandwiched with cross nicol polarizers to observe the coloring with naked eyes, whereby no region of cell thickness increase was recognized by coloring.

X-ray diffraction analysis was performed by using a sample cell with a cell thickness of 1.5 μm prepared by using 80 μm-thick glass plates treated in the same manner as above. The results of measurement of the layer inclination angle δ, peak half-value width (FWMH) and diffraction peak area are summarized in Table 8 appearing hereinafter. As shown in Table 8. The peak area and the half-value width obtained in this Example 4 were respectively 103% and 1.15 times of those of Comparative Example 5 described hereinafter.

EXAMPLE 5

A liquid crystal cell prepared in the same manner as in Example 4 up to the aging at 100° C. was then subjected to cooling at a rate of −4° C./min to 50° C., and 10 min. of AC application at 50° C. of AC±7 volts and 100 Hz.

In the entire temperature range of Sm*C in the resultant cell, C1 alignment was retained and switching by electric field between uniform states was possible. The apparent tilt angle θ$_a$ was 11.5 degrees.

Then, the cell was brought to orientations 81 and 82 as shown in FIG. 18 and the entire cell was subjected to application of a set of driven waveforms shown in FIG. 19 (Vop=25 volts, Δt=25 μs) for about 7 hours. Thereafter, the cell thickness change (%) at the regions 83–86 in FIG. 18 was measured with respect to the initial value. The results are shown in the following Table 3.

TABLE 3

| Region | 83 | 84 | 85 | 86 |
|---|---|---|---|---|
| Cell-thickness change | +4% | −3% | +4% | −2% |

The cell was sandwiched with cross nicol polarizers to observe the coloring with naked eyes, whereby no region of cell thickness increase was recognized by coloring.

EXAMPLE 6

A liquid crystal cell prepared in the same manner as in Example 4 up to the aging at 100° C. was then subjected to cooling at a rate of −4° C./min to 25° C., and 10 min. of AC application at 25° C. of AC±7 volts and 100 Hz.

In the entire temperature range of Sm*C in the resultant cell, C1 alignment was retained and switching by electric field between uniform states was possible. The apparent tilt angle θa was 11.5 degrees.

Then, the cell was brought to orientations 81 and 82 as shown in FIG. 18 and the entire cell was subjected to application of a set of driven waveforms shown in FIG. 19 (Vop=25 volts, Δt=25 μs) for about 7 hours. Thereafter, the cell thickness change (%) at the regions 83–86 in FIG. 18 was measured with respect to the initial value. The results are shown in the following Table 4.

TABLE 4

| Region | 83 | 84 | 85 | 86 |
|---|---|---|---|---|
| Cell-thickness change | +5% | −3% | +4% | −2% |

The cell was sandwiched with cross nicol polarizers to observe the coloring with naked eyes, whereby no region of cell thickness increase was recognized by coloring.

EXAMPLE 7

A liquid crystal cell prepared in the same manner as in Example 4 up to the aging at 100° C. was then subjected to the following treatment:

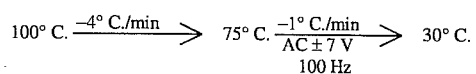

In the entire temperature range of Sm*C in the resultant cell, C1 alignment was retained and switching by electric field between uniform states was possible. The apparent tilt angle θ$_a$ was 11.5 degrees.

Then, the cell was brought to orientations 81 and 82 as shown in FIG. 18 and the entire cell was subjected to application of a set of driven waveforms shown in FIG. 19 (Vop=25 volts, Δt=25 μs) for about 7 hours. Thereafter, the cell thickness change (%) at the regions 83–86 in FIG. 18 was measured with respect to the initial value. The results are shown in the following Table 5.

TABLE 5

| Region | 83 | 84 | 85 | 86 |
|---|---|---|---|---|
| Cell-thickness change | +2% | −1% | +2% | 0% |

The cell was sandwiched with cross nicol polarizers to observe the coloring with naked eyes, whereby no region of cell thickness increase was recognized by coloring.

X-ray diffraction analysis was performed similarly as in Example 4. The results of measurement of the layer inclination angle δ, peak half-value width (FWMH) and diffraction peak area are summarized in Table 8 appearing hereinafter. As shown in Table 8. The peak area and the half-value width obtained in this Example 7 were respectively 83% and 1.18 times of those of Comparative Example 5 described hereinafter.

EXAMPLE 8

A liquid crystal cell prepared in the same manner as in Example 4 up to the aging at 100° C. was then subjected to the following treatment:

$$100° C. \xrightarrow{-4° C./min} (30° C. \xrightarrow{4° C./min}$$

$$75° C. \xrightarrow{-4° C./min} 30° C.) \times 3 \text{ times}$$

In the entire temperature range of Sm*C in the resultant cell, C1 alignment was retained and switching by electric field between uniform states was possible. The apparent tilt angle $\theta_a$ was 11.5 degrees.

Then, the cell was brought to orientations 81 and 82 as shown in FIG. 18 and the entire cell was subjected to application of a set of driven waveforms shown in FIG. 19 (Vop=25 volts, Δt=25 μs) for about 7 hours. Thereafter, the cell thickness change (%) at the regions 83–86 in FIG. 18 was measured with respect to the initial value. The results are shown in the following Table 6.

TABLE 6

| Region | 83 | 84 | 85 | 86 |
|---|---|---|---|---|
| Cell-thickness change | +5% | −3% | +5% | −2% |

The cell was sandwiched with cross nicol polarizers to observe the coloring with naked eyes, whereby no region of cell thickness increase was recognized by coloring.

X-ray diffraction analysis was performed similarly as in Example 4. The results of measurement of the layer inclination angle δ, peak half-value width (FWMH) and diffraction peak area are summarized in Table 8 appearing hereinafter. As shown in Table 8. The peak area and the half-value width obtained in this Example 8 were respectively 80% and 1.23 times of those of Comparative Example 5 described hereinafter.

COMPARATIVE EXAMPLE3

A liquid crystal cell prepared in the same manner as in Example 4 up to the aging at 100° C. was then cooled at a rate of −4° C./min to 30° C. The cell was then subjected to evaluation in the same manner as in Example 4 without further treatment. In the entire temperature range of Sm*C in the resultant cell, C1 alignment was retained and switching by electric field between uniform states was possible. The apparent tilt angle $\theta_a$ was 11.5 degrees.

Then, the cell was brought to orientations 81 and 82 as shown in FIG. 18 and the entire cell was subjected to application of a set of driven waveforms shown in FIG. 19 (Vop=25 volts, Δt=25 μs) for about 7 hours. Thereafter, the cell thickness change (%) at the regions 83–86 in FIG. 18 was measured with respect to the initial value. The results are shown in the following Table 7.

TABLE 7

| Region | 83 | 84 | 85 | 86 |
|---|---|---|---|---|
| Cell-thickness change | +40% | −10% | +50% | −8% |

The cell was sandwiched with cross nicol polarizers to observe the coloring with naked eyes, whereby the regions 83 and 85 were colored in yellow due to a remarkable thickness change in the case of displaying white.

X-ray diffraction analysis was performed similarly as in Example 4. The results of measurement of the layer inclination angle δ, peak half-value width (FWMH) and diffraction peak area are summarized in Table 8 appearing hereinafter. As shown in Table 8. The peak area and the half-value width obtained in this Comparative Example 3 were respectively 53% and 1.53 times of those of Comparative Example 5 described hereinafter.

COMPARATIVE EXAMPLE 4

A liquid crystal cell prepared in the same manner as in Example 4 up to the aging at 100° C. except that the rubbing density was made 3 times that used in Example 4 (i.e., by applying the rubbing three times to a substrate with the same rubbing roller), was then cooled at a rate of −4° C./min to 30° C., and then the alignment state was observed. The pretilt angle was measured to be 9 degrees under the above-mentioned rubbing condition. As a result of the observation, C2 alignment appears in Sm*C phase at temperatures below 55° C., whereby switching between homogeneous uniform states failed.

COMPARATIVE EXAMPLE 5

A glass substrate measuring 7.5 cm×7.5 cm and provided with transparent electrodes was coated with a tantalum oxide film by sputtering and then coated with 1% NMP-solution of a polyamide acid as a precursor to a polyimide of the following structural formula:

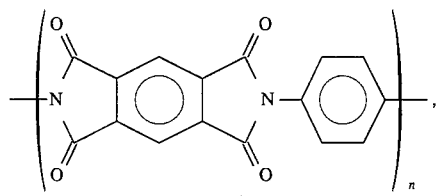

n: positive integer.

followed by baking at 270° C. for 1 hour and rubbing. This substrate and another substrate treated in the same manner were applied to each other with a cell gap of 1.5 μm therebetween to form a cell, so that their rubbing directions were almost identical but formed an intersection angle of a right-screw or clockwise screw (as viewed from above the cell) of 10 degrees. The cell showed a pretilt angle of 1.5 degrees according to the crystal rotation method. The cell was filled with the same phenylpyrimidine-based mixture liquid crystal as used in Example 4. The resultant liquid crystal showed homogeneous C2 splay alignment in Sm*C phase at temperatures below 63° C.

X-ray diffraction analysis was performed similarly as in Example 4. The results of measurement of the layer inclination angle δ, peak half-value width (FWMH) and diffraction peak area are summarized in Table 8 together with the results in Examples 4, 7, 8 and Comparative Example 3.

TABLE 8

|  | Example | | | Comp. Example | |
| --- | --- | --- | --- | --- | --- |
|  | 4 | 7 | 8 | 3 | 5 |
| δ (deg.) | 11.6 | 11.8 | 11.9 | 12.4 | 10.2 |
| Peak area (counts) | 17219 | 13795 | 13437 | 8938 | 16709 |
| FWHM (deg.) | 1.90 | 1.95 | 2.00 | 2.50 | 1.65 |

As described above, according to the present invention, the order of smectic layer structure can be increased even in a high pretilt angle cell with a pretilt angle of, e.g., at least 10 degrees, by applying the above-mentioned realigning treatment, whereby it has become possible to remarkably decrease the cell thickness change due to liquid crystal movement.

As a means for increasing the order of smectic layer structure, it has been also found effective to use a ferroelectric liquid crystal having a phase transition series of Iso.→Ch.→Sm*C.

Further, in an anti-parallel rubbing cell in which a pair of substrates have been rubbed in mutually parallel but opposite directions, the above-mentioned liquid crystal movement does not occur, but the above-mentioned realigning treatment has been found effective for removing structural defects in the smectic layer structure.

More specifically, even in an anti-parallel rubbing cell, likewise in a parallel rubbing cell, the layer structure is liable to be affected by substrate boundaries to result in curving of smectic layers, which however is assumed to be removed by the above-mentioned realigning treatment to provide a homogeneous layer structure as shown in FIG. 5B. However, the details have not been clarified as yet.

Further, according to the present invention, there is provided a ferroelectric liquid crystal device wherein pretilt angles are corrected to provide an improved bistability and a high contrast alignment and also to remarkably decrease the local cell thickness change during drive.

Further, according to the present invention, it is generally possible to minimize the cell thickness increase along a side in a ferroelectric liquid crystal device, thus providing a stable drive for a long period.

What is claimed is:

1. A treatment method for a chiral smectic liquid crystal device, comprising the steps of:

providing a chiral smectic liquid crystal device comprising a chiral smectic liquid crystal and a pair of substrates sandwiching the chiral smectic liquid crystal, each substrate having thereon an electrode for applying a voltage to the chiral smectic liquid crystal, the pair of substrates being provided with uniaxial alignment axes in directions which are substantially identical so as to provide a pretilt angle α of at least 10 degrees between a substrate boundary and liquid crystal molecules adjacent to the boundary;

subjecting the entire chiral smectic liquid crystal to heating and cooling within a smectic phase temperature range; and applying an AC electric field to the chiral smectic liquid crystal during the heating or cooling.

2. A method according to claim 1, wherein said chiral smectic liquid crystal is placed in an alignment state providing at least two stable states of optical axes which form an angle $2\theta_a$ therebetween satisfying (H)>$\theta_a$>(H)/2, wherein $\theta_a$ denotes an apparent tilt angle and (H) denotes a cone angle of the chiral smectic liquid crystal.

3. A method according to claim 1, wherein said chiral smectic liquid crystal is placed in an alignment state satisfying (H)−δ<α, wherein (H) denotes a cone angle and δ denotes a layer inclination angle, respectively, on the chiral smectic liquid crystal.

4. A method according to any of claims 1 to 3, wherein the heating and cooling steps are repeated.

5. A method according to claim 4, wherein the heating and cooling occurs only within the smectic phase temperature range of the chiral smectic liquid crystal.

6. A method according to claim 4, wherein said chiral smectic liquid crystal is placed in an alignment state providing at least two stable states of optical axes which form an angle $2\theta_a$ therebetween satisfying (H)>$\theta_a$>(H)/2, wherein $\theta_a$ denotes an apparent tilt angle and (H) denotes a cone angle of the chiral smectic liquid crystal.

7. A method according to claim 4, wherein said chiral smectic liquid crystal is placed in an alignment state satisfying (H)−δ<α, wherein (H) denotes a cone angle and δ denotes a layer inclination angle of the chiral smectic liquid crystal.

8. A method according to claim 1, wherein said uniaxial alignment axes provided to said pair of substrates intersect each other at an intersection angle θc satisfying: 20 degrees>θc>0 degree.

9. A method according to claim 1 wherein said chiral smectic liquid crystal has a smectic A (SmA) phase on a higher temperature side than a chiral smectic C (SmC*) phase and the heating and cooling is effected through an SmA-SmC* phase transition temperature under application of the AC electric field.

10. A method according to claim 1, wherein said chiral smectic liquid crystal has a smectic A (SmA) phase on a higher temperature side than a chiral smectic C (SmC*) phase and the heating and cooling is effected so as to cause at least one cycle of phase transition of SmC*→SmA→SmC* simultaneously with application of the AC electric field.

* * * * *

UNITED STATES PATENT AND TRADEMARK OFFICE
CERTIFICATE OF CORRECTION

PATENT NO. : 5,543,943

DATED : August 6, 1996

INVENTOR(S) : YUKIO HANYU ET AL.

It is certified that error appears in the above-identified patent and that said Letters Patent is hereby corrected as shown below:

COLUMN 1

Line 21, "generally" should read --generally a--.

COLUMN 3

Line 1, "in" should read --in the--.

COLUMN 4

Line 11, "in" should read --is--.

COLUMN 8

Line 27, "have" should read --having--.
    Line 50, "in" (last occurrence) should read --in the--.
    Line 63, "by" should be deleted.

COLUMN 9

Line 38, "$\alpha^1 = \alpha^2_{Co}$" should read --$\alpha^1_{Ci} = \alpha^2_{Co}$--.

COLUMN 11

Line 13, "polyimides," should read --polyimide,--.
    Line 16, "In" should read --In the--.

COLUMN 12

Line 14, "a" should read --an--.
    Line 42, "in" should read --in the--.

UNITED STATES PATENT AND TRADEMARK OFFICE
CERTIFICATE OF CORRECTION

PATENT NO. : 5,543,943

DATED : August 6, 1996

INVENTOR(S) : YUKIO HANYU ET AL.

It is certified that error appears in the above-identified patent and that said Letters Patent is hereby corrected as shown below:

COLUMN 13

Line 47, "include" should read --includes--.

COLUMN 14

Line 53, "amount" should read --amounted--.
    Line 56, "of measurement" should read --of the measurement of--.

COLUMN 16

Line 12, "$\alpha_A=\alpha_{Ci}\alpha_{Co}=19$" should read --$\alpha_A=\alpha_{Ci}=\alpha_{Co}=19$--.

COLUMN 17

Line 49, "8.  The" should read --8, the--.

COLUMN 19

Line 17, "8.  The" should read --8, the--.
    Line 58, "8.  The" should read --8, the--.
    Line 63, "EXAMPLE3" should read --EXAMPLE 3--.

UNITED STATES PATENT AND TRADEMARK OFFICE
CERTIFICATE OF CORRECTION

PATENT NO. : 5,543,943

DATED : August 6, 1996

INVENTOR(S) : YUKIO HANYU ET AL.

It is certified that error appears in the above-identified patent and that said Letters Patent is hereby corrected as shown below:

<u>COLUMN 20</u>

Line 28, "8.  The" should read --8, the--.

<u>COLUMN 22</u>

Line 24, "on" should read --of--.

Signed and Sealed this

Twenty-fourth Day of February, 1998

Attest:

BRUCE LEHMAN

Attesting Officer

Commissioner of Patents and Trademarks